United States Patent
Yano et al.

[11] Patent Number: 6,124,690
[45] Date of Patent: Sep. 26, 2000

[54] CONTROL SYSTEM FOR HYBRID VEHICLE

[75] Inventors: Toru Yano; Yutaka Tamagawa; Yusuke Tatara, all of Wako, Japan

[73] Assignee: Honda Giken Kogyo Kabushiki Kaisha, Tokyo, Japan

[21] Appl. No.: 09/240,586

[22] Filed: Feb. 1, 1999

[30] Foreign Application Priority Data

Feb. 3, 1998 [JP] Japan .................................. 10-035363

[51] Int. Cl.$^7$ ...................................................... B60K 6/04
[52] U.S. Cl. ......................... 318/376; 318/139; 180/65.2; 180/65.8
[58] Field of Search ..................... 318/139, 375, 318/376; 180/65.1–65.4, 65.6, 65.7, 65.8; 320/2, 5, 61; 701/22

[56] References Cited

U.S. PATENT DOCUMENTS

| | | | |
|---|---|---|---|
| 4,313,080 | 1/1982 | Park | 320/61 |
| 5,832,396 | 11/1998 | Moroto et al. | 701/22 |
| 5,839,533 | 11/1998 | Mikami et al. | 180/165 |
| 5,984,033 | 11/1999 | Tamagawa et al. | 180/65.2 |

FOREIGN PATENT DOCUMENTS 7-123509  5/1995  Japan .

*Primary Examiner*—Bentsu Ro
*Attorney, Agent, or Firm*—Arent Fox Kintner Plotkin & Kahn PLLC

[57] ABSTRACT

A control system controls a hybrid vehicle having an engine for rotating a drive axle, an electric motor for assisting the engine in rotating the drive axle with electric energy and converting kinetic energy of the drive axle into electric energy, and an electric energy storage unit or a capacitor for supplying electric energy to the electric motor and storing electric energy outputted by the electric motor. When the remaining capacity CAPAremc of the capacitor is smaller than a first predetermined remaining capacity REMC1 or the remaining capacity CAPAremc of the capacitor is smaller than a second predetermined remaining capacity REMC2 (>REMC1) and an assistive-mode integrated discharged value DISCHG of the capacitor 14, which is calculated while the electric motor has operated in a latest mode to assist in running the hybrid vehicle, is greater than a predetermined discharged quantity disch1, the control system calculates a regenerated quantity increasing corrective coefficient Kregup (>1) depending on the vehicle speed. The control system multiplies a basic decelerating regenerative quantity DECreg by the corrective coefficient Kregup to determine a demand output power MOTORpower for the electric motor for thereby increasing the amount of electric energy regenerated by the electric motor when the hybrid vehicle decelerates.

12 Claims, 13 Drawing Sheets

FIG. 10

| θthcom (DEGREES) | NE (rpm) | 0 | 500 | | 9500 | 10000 |
|---|---|---|---|---|---|---|
| 0 | | | | | | |
| 1 | | | | | | |
| ⋮ | | | DEMAND DRIVE POWER POWERcom (KW) | | | |
| 89 | | | | | | |
| 90 | | | | | | |

FIG. 11

| EXPOWER (Kw) | Vcar (Km/h) | 0 | 10 | | 160 | 170 |
|---|---|---|---|---|---|---|
| 0 | | | | | | |
| 1 | | | | | | |
| ⋮ | | | RUNNING STATUS QUANTITY VSTATUS (%) | | | |
| 99 | | | | | | |
| 100 | | | | | | |

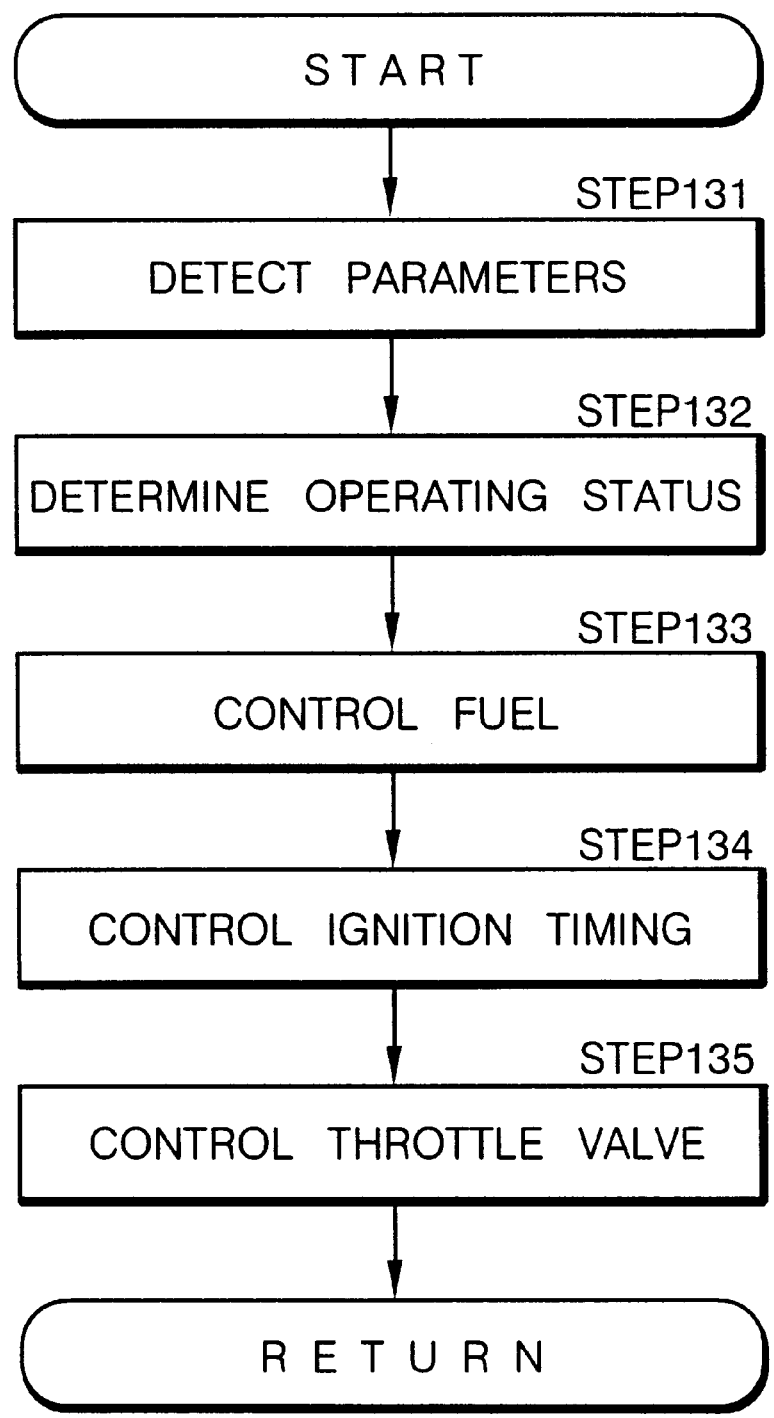

CONTROL SYSTEM FOR HYBRID VEHICLE

BACKGROUND OF THE INVENTION

1. Field of the Invention

The present invention relates to a control system for controlling a hybrid vehicle having an internal combustion engine and an electric motor as separate propulsion sources, and more particularly to a control system for controlling a hybrid vehicle to regenerate electric energy with an electric motor when the hybrid vehicle is decelerated.

2. Description of the Related Art

There have heretofore been known hybrid vehicles each having an internal combustion engine and an electric motor as separate propulsion sources. For accelerating such a hybrid vehicle, the drive axle of the hybrid vehicle is driven by the engine, and stored electric energy is supplied from an electric energy storage unit such as a battery to the electric motor to enable the electric motor to assist in rotating the drive axle. For decelerating the hybrid vehicle, the kinetic energy of the drive axle, i.e., the kinetic energy transmitted from the drive wheels of the hybrid vehicle to the drive axle, is supplied to the electric motor to regenerate electric energy, which is stored in the electric energy storage unit.

One known control system for such a hybrid vehicle is disclosed in Japanese laid-open patent publication No. 7-123509, for example.

According to the disclosed control system, the present capacity (remaining capacity) of a battery as an electric energy storage unit is detected from time to time, and an amount of electric energy that can be regenerated by an electric motor, i.e., an amount of regeneratable electric energy, until the hybrid vehicle comes to a stop is determined from the vehicle speed, etc. Upon acceleration of the hybrid vehicle when the throttle valve of the engine is opened beyond a predetermined opening value, if the sum of the remaining capacity of the battery and the amount of regeneratable electric energy is greater than a minimum capacity of the battery required for the electric motor to restart the engine, then the electric motor is energized to assist in rotating the drive axle.

When the brake pedal of the hybrid vehicle is depressed to brake the hybrid vehicle, if the sum of the remaining capacity of the battery and the amount of regeneratable electric energy is smaller than a reference capacity which is substantially equal to the capacity of the fully charged battery, then since the battery needs to be charged, the electric motor regenerates electric energy, which is stored in the battery. At this time, the amount of regenerated electric energy is controlled in proportion to the depth to which the brake pedal is depressed.

When the opening of the throttle valve is smaller than the predetermined opening value and the brake pedal is not depressed, if the sum of the remaining capacity of the battery and the amount of regeneratable electric energy is smaller than the reference capacity, then electric energy is generated by the electric motor and stored in the battery. The amount of electric energy that is generated by the electric motor is controlled depending on an amount of electric energy to be charged, which is represented by the difference between the sum of the remaining capacity of the battery and the amount of regeneratable electric energy and the reference capacity.

However, the above known control system has suffered the following drawbacks:

According to the above known control system, when the hybrid vehicle is decelerated by braking, the remaining capacity of the battery is taken into account for deciding whether the electric motor is to regenerate electric energy, but the amount of electric energy regenerated by the electric motor is proportional to the depth to which the brake pedal is depressed, irrespective of the remaining capacity of the battery. Therefore, if the depth to which the brake pedal is depressed is relatively small to brake the hybrid vehicle slowly, then the amount of regenerated electric energy is small. If the hybrid vehicle is temporarily decelerated, but not stopped, by braking, then the kinetic energy of the running hybrid vehicle cannot be converted into a sufficient amount of electric energy for storage in the battery. As a result, when the hybrid vehicle is to be accelerated after such temporary deceleration, no sufficient amount of electric energy can be supplied from the battery to the electric motor, and hence the electric motor fails to provide sufficient assistance in rotating the drive axle.

With the above known control system, while the accelerator pedal is being released in order to decelerate the hybrid vehicle, the electric motor regenerates an amount of electric energy depending on the amount of electric energy to be charged, which is referred to above, until the brake pedal is depressed. Therefore, when the hybrid vehicle decelerates in this manner, the amount of electric energy regenerated by the electric motor takes into account the remaining capacity of the battery.

However, as when the hybrid vehicle is decelerated by braking, the electric motor regenerates electric energy only when the sum of the remaining capacity of the battery and the amount of regeneratable electric energy, i.e., the amount of electric energy that can be regenerated by the electric motor until the hybrid vehicle is stopped from the present vehicle speed. Thus, when the hybrid vehicle runs at a high speed at which the amount of regeneratable electric energy is relatively large, no electric energy can be regenerated by the electric motor unless the hybrid vehicle decelerates to a sufficiently low vehicle speed. In this case, when the hybrid vehicle running at a high speed decelerates, the electric motor does not generate a regenerative braking torque, failing to maintain sufficient braking forces for the hybrid vehicle.

SUMMARY OF THE INVENTION

It is therefore an object of the present invention to provide a control system for controlling a hybrid vehicle to control an amount of electric energy regenerated by an electric motor when the hybrid vehicle decelerates for thereby maintaining vehicle braking forces suitable for the running status of the hybrid vehicle, and to store in an electric energy storage unit a sufficient amount of electric energy necessary for the electric motor to assist in running the hybrid vehicle.

According to the present invention, the above object can be achieved by a control system for controlling a hybrid vehicle having an engine for rotating a drive axle, an electric motor for assisting the engine in rotating the drive axle with electric energy and converting kinetic energy of the drive axle into electric energy, and electric energy storage means for supplying electric energy to the electric motor and storing electric energy outputted by the electric motor, comprising remaining capacity detecting means for detecting a remaining capacity of the electric energy storage means, and decelerating regenerative control means for establishing an amount of electric energy to be regenerated by the electric motor when the hybrid vehicle decelerates depending on at least a vehicle speed of the hybrid vehicle, and causing the electric motor to regenerate the established amount of electric energy, the decelerating regenerative control means comprising means for correcting the amount of electric energy to be regenerated by the electric motor depending on the remaining capacity of the electric energy storage means as detected by the remaining capacity detecting means.

When the hybrid vehicle decelerates, a basic amount of electric energy to be regenerated by the electric motor is established depending on the vehicle speed, and corrected depending on the remaining capacity of the electric energy storage means as detected by the remaining capacity detecting means. The electric motor then regenerates the corrected amount of electric energy. Since the basic amount of electric energy to be regenerated by the electric motor is established depending on the vehicle speed, it is possible to optimize braking forces (regenerative braking torque) generated for the hybrid vehicle by regenerative operation of the electric motor, with respect to the running status of the hybrid vehicle. Because the amount of electric energy to be regenerated by the electric motor is corrected depending on the remaining capacity of the electric energy storage means, it is possible for the electric energy storage means to store a sufficient amount of electric energy which will be required by the electric motor to assist in running the hybrid vehicle.

Therefore, since it is possible to maintain braking forces for the hybrid vehicle, optimum for the running status of the hybrid vehicle, and also to store in the electric energy storage means a sufficient amount of electric energy which will be required by the electric motor to assist in running the hybrid vehicle, the electric motor can operate sufficiently to assist in running the hybrid vehicle.

Specifically, the decelerating regenerative control means comprises means for establishing the amount of electric energy to be regenerated by the electric motor such that the amount of electric energy to be regenerated by the electric motor, prior to being corrected depending on the remaining capacity of the electric energy storage means as detected by the remaining capacity detecting means, increases as the vehicle speed is higher.

As the vehicle speed is higher, greater braking forces are required to decelerate the hybrid vehicle, and the kinetic energy of the hybrid vehicle which can be converted into electric energy by the regenerative operation of the electric motor is greater. Therefore, the basic amount of electric energy to be regenerated by the electric motor is increased when the hybrid vehicle decelerates.

As described above, the basic amount of electric energy to be regenerated by the electric motor when the hybrid vehicle decelerates is established depending on the vehicle speed. Consequently, as the vehicle speed is higher, braking forces (regenerative braking torque) generated for the hybrid vehicle by the regenerative operation of the electric motor are increased, making it possible to maintain braking forces optimum for the running status of the hybrid vehicle. Furthermore, the kinetic energy of the hybrid vehicle can effectively be converted into electric energy for storage in the electric energy storage means.

More preferably, the decelerating regenerative control means comprises means for establishing the amount of electric energy to be regenerated by the electric motor, prior to being corrected depending on the remaining capacity of the electric energy storage means as detected by the remaining capacity detecting means, depending on the vehicle speed and a rotational speed of the engine or the electric motor.

Specifically, the decelerating regenerative control means comprises means for establishing the amount of electric energy to be regenerated by the electric motor such that the amount of electric energy to be regenerated by the electric motor, prior to being corrected depending on the remaining capacity of the electric energy storage means as detected by the remaining capacity detecting means, increases as the vehicle speed is higher, and increases as the rotational speed of the engine or the electric motor is higher.

The basic amount of electric energy to be regenerated by the electric motor when the hybrid vehicle decelerates is established depending on the vehicle speed according to the above tendency, and also depending on the rotational speed of the engine or the electric motor. For establishing the basic amount of electric energy to be regenerated by the electric motor depending on the rotational speed of the engine or the electric motor, since the amount of electric energy regenerated by the electric motor, required for the electric motor to generate desired braking forces (regenerative braking torque), is greater as the rotational speed of the engine or the electric motor is higher, the amount of electric energy to be regenerated by the electric motor is increased as the rotational speed of the engine or the electric motor is higher.

In this manner, braking forces for the hybrid vehicle which are generated by regenerative operation of the electric motor are made more optimum for the running status of the hybrid vehicle for improving the drivability of the hybrid vehicle.

With respect to correcting the amount of electric energy to be regenerated by the electric motor depending on the remaining capacity of the electric energy storage means, the decelerating regenerative control means comprises means for increasing the amount of electric energy to be regenerated by the electric motor if the remaining capacity of the electric energy storage means as detected by the remaining capacity detecting means is smaller than a first predetermined remaining capacity.

Because the amount of electric energy to be regenerated by the electric motor is increased if the detected remaining capacity of the electric energy storage means is smaller than the first predetermined remaining capacity, the remaining capacity of the electric energy storage means is reliably and quickly prevented from being lowered. Since the remaining capacity of the electric energy storage means is prevented from being lowered, the electric energy storage means is prevented from being unduly deteriorated.

It is preferable that the first predetermined remaining capacity be established on the basis of driving efficiency characteristics of the electric motor with respect to the remaining capacity of the electric energy storage means when the electric motor operates to assist in running the hybrid vehicle.

The driving efficiency of the electric motor (the energy efficiency of the electric motor for generating an drive power from the electric motor (the ratio of an output energy from the electric motor to an input energy applied to the electric motor)) falls greatly when the remaining capacity of the electric energy storage means becomes smaller than a certain value. When the remaining capacity of the electric energy storage means is so small that the driving efficiency falls, the electric motor fails to smoothly assist in running the hybrid vehicle. To avoid this shortcoming, according to the present invention, the first predetermined remaining capacity is established on the basis of driving efficiency characteristics of the electric motor, e.g., a remaining capacity near the remaining capacity of the electric energy storage means at which the driving efficiency of the electric motor starts to fall greatly is established as the first predetermined remaining capacity. If the detected remaining capacity of the electric energy storage means is smaller than the first predetermined remaining capacity thus established, the amount of electric energy to be regenerated by the electric motor when the hybrid vehicle decelerates is increased so as to be greater than the basic amount of electric energy to be regenerated by the electric motor depending on the vehicle speed. In this fashion, the remaining capacity of the electric energy storage means can be maintained at a remaining capacity capable of enabling the electric motor to smoothly assist in running the hybrid vehicle.

The control system further comprises discharged quantity integrating means for integrating a discharged quantity of the electric energy storage means each time and while the electric motor operates to assist in running the hybrid vehicle, the decelerating regenerative control means comprising means for increasing the amount of electric energy to be regenerated by the electric motor if the remaining capacity of the electric energy storage means as detected by the remaining capacity detecting means is smaller than a second predetermined remaining capacity which is greater than the first predetermined remaining capacity and if an integrated value of the discharged quantity of the electric energy storage means, which is integrated by the discharged quantity integrating means while the electric motor has operated in a latest mode to assist in running the hybrid vehicle before the hybrid vehicle decelerates, is greater than a predetermined value.

Even when the detected remaining capacity of the electric energy storage means is greater than the first predetermined remaining capacity for the regenerative operation of the electric motor when the hybrid vehicle decelerates, in a situation where the remaining capacity of the electric energy storage means is smaller than the second predetermined remaining capacity and close to the first predetermined remaining capacity, if the integrated value of the discharged quantity of the electric energy storage means while the electric motor has operated in a latest mode to assist in running the hybrid vehicle before the hybrid vehicle decelerates is greater than the predetermined value, then the amount of electric energy to be regenerated by the electric motor is increased when the hybrid vehicle decelerates presently. That is, if the integrated value of the discharged quantity of the electric energy storage means is relatively large as when the hybrid vehicle is accelerated with a large drive power from the electric motor immediately before the hybrid vehicle decelerates presently, then the amount of electric energy to be regenerated by the electric motor is increased before the remaining capacity of the electric energy storage means becomes smaller than the first predetermined remaining capacity, keeping the remaining capacity of the electric energy storage means at a high level. In this manner, even when the electric motor frequently operated to assist running the hybrid vehicle with a large drive power, it is possible to store a sufficient amount of electric energy required to energize the electric motor in the electric energy storage means.

The control system preferably comprises voltage lowering means for converting an output voltage of the electric energy storage means into a lower voltage, the electric energy storage means being connected through the voltage lowering means to electric components on the hybrid vehicle for supplying electric energy to the electric components, the second predetermined remaining capacities being established on the basis of operating efficiency characteristics of the voltage lowering means.

In the case where the electric energy storage means is connected through the voltage lowering means, e.g., a DC/DC converter, to the electric components, which operate at a voltage lower than the output voltage of the electric energy storage means for supplying electric energy to the electric components, the operating efficiency of the voltage lowering means (the ratio of an output energy from the voltage lowering means to an input energy applied to the voltage lowering means) is greatly lowered, failing to supply sufficient electric energy to the electric components, if the remaining capacity of the electric energy storage means becomes smaller than a certain value. To eliminate this drawback, according to the present invention, the second predetermined remaining capacity is established on the basis of the operating efficiency characteristics of the voltage lowering means, e.g., the remaining capacity of the electric energy storage means at which the operating efficiency of the voltage lowering means does not drop greatly is established as the second predetermined remaining capacity. It is thus possible to maintain, as much as possible, the remaining capacity of the electric energy storage means at which the voltage lowering means provides a good operating efficiency, and also to supply electric energy smoothly from the electric energy storage means to the electric components.

For increasing the amount of electric energy to be regenerated by the electric motor depending on the remaining capacity of the electric energy storage means, the decelerating regenerative control means comprises means for establishing a quantity by which to increase the amount of electric energy to be regenerated by the electric motor, depending on the vehicle speed.

Specifically, the decelerating regenerative control means comprises means for establishing the quantity such that the quantity increases as the vehicle speed is higher.

As described above, the amount of electric energy to be regenerated by the electric motor is increased as the vehicle speed is higher. Therefore, as the vehicle speed is higher, braking forces for the hybrid vehicle which are generated by the regenerative operation of the electric motor are increased thereby to improve the drivability of the hybrid vehicle.

The decelerating regenerative control means comprises means for determining a demand drive power for the hybrid vehicle depending on an accelerator pedal operation of the hybrid vehicle, means for determining a running resistance of the hybrid vehicle depending on the vehicle speed, and means for deciding whether the hybrid vehicle is decelerating or not based on the determined demand drive power and the determined running resistance.

Since it is decided whether the hybrid vehicle is decelerating or not based on the demand drive power for the hybrid vehicle depending on the accelerator pedal operation of the hybrid vehicle and the running resistance of the hybrid vehicle depending on the vehicle speed, such a decision can be made adequately, and hence the electric motor operates to regenerate electric energy with appropriate timing. Basically, it may be determined that the hybrid vehicle is decelerating when the demand drive power for the hybrid vehicle is smaller than the running resistance.

The control system further comprises means for increasing an output power of the engine when the decelerating regenerative control means increases the amount of electric energy to be regenerated by the electric motor.

For increasing the amount of electric energy to be regenerated by the electric motor, therefore, the output power of the engine, in addition to the kinetic energy of the hybrid vehicle that is transmitted to the drive axle, is supplied to the electric motor as an energy for regenerative operation of the electric motor. Consequently, even when the vehicle speed is relatively low, a sufficient amount of regenerated electric energy is maintained for charging the electric energy storage means.

The electric energy storage means comprises an electric double-layer capacitor.

The electric energy storage means in the form of an electric double-layer capacitor can discharge a high output power in a short period of time for enabling the electric motor to adequately assist in running the hybrid vehicle.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 10 is a diagram showing a map for determining a demand drive power;

FIG. 11 is a diagram showing a map for determining a running status quantity;

FIG. 16 is a flowchart of an engine control process for controlling the engine of the hybrid vehicle shown in FIG. 1.

DETAILED DESCRIPTION OF THE PREFERRED EMBODIMENT

Figure 1:
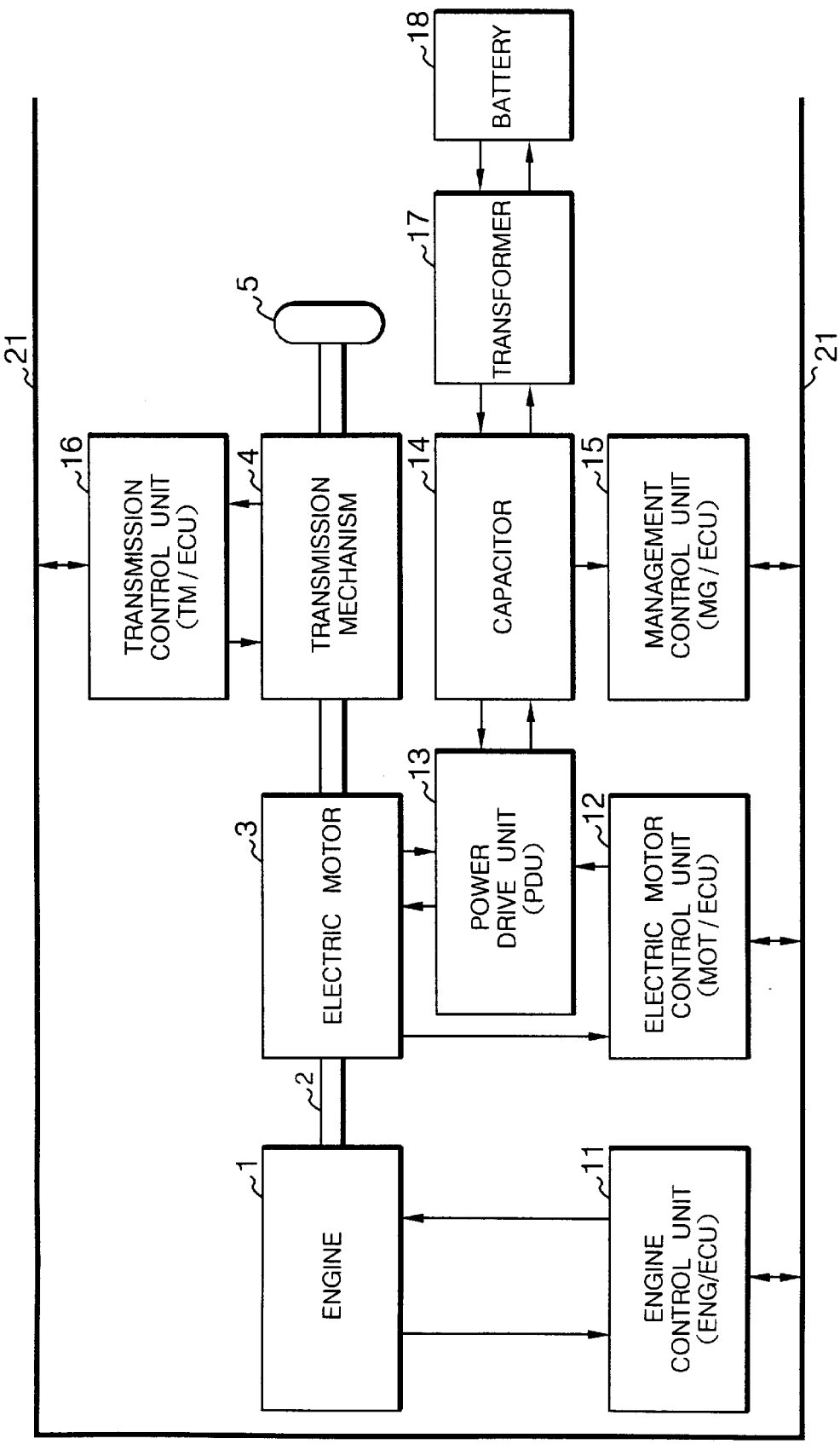
FIG. 1 is a block diagram of a drive apparatus of a hybrid vehicle and a control system therefor according to the present invention.

FIG. 1 shows in block form a drive apparatus of a hybrid vehicle and a control system therefor according to the present invention. Other components of the hybrid vehicle, including sensors, actuators, etc., are omitted from illustration in FIG. 1.

As shown in FIG. 1, the hybrid vehicle has an internal combustion engine 1 which rotates a drive axle 2 for rotating drive wheels 5 (only one shown) through a transmission mechanism 4. An electric motor, i.e., an electric motor capable of operating also as an electric generator, 3 is connected to rotate the drive axle 2 directly. The electric motor 3 has a rotatable shaft (not shown) coupled coaxially to the output shaft (not shown) of the engine 1. In addition to the ability to rotate the drive axle 2, the electric motor 3 has a regenerative ability to operate as an electric generator to convert kinetic energy produced by the rotation of the drive axle 2 into electric energy. The electric motor 3 is connected to a capacitor 14 serving as an electric energy storage unit through a power drive unit (PDU) 13 of the control system. The electric motor 3 is controlled by the power drive unit 13 to rotate the drive axle 2 and generate electric energy in a regenerative mode. In this embodiment, the capacitor 14 comprises an electric double-layer capacitor having a large electrostatic capacitance.

The capacitor 14 is connected through a transformer 17 (DC/DC converter) to electric components (not shown), including engine control actuators, a radio receiver, head lamps, etc. on the hybrid vehicle, which operate at a voltage (12 V, for example) lower than the output voltage (180 V, for example) of the capacitor 14, and also to a battery 18 which is mounted on the hybrid vehicle as a major power supply for the electric components. The transformer 17 basically functions as a voltage lowering means for lowering the output voltage of the capacitor 14 and applying the lowered voltage to the battery 18 and the electric components. The transformer 17 also functions as a voltage increasing means for increasing the output voltage of the battery 18 and applying the increased voltage to the capacitor 14 if the remaining capacity of the capacitor 14 is reduced.

The control system also has an engine control unit (ENG/ECU) 11 for controlling the engine 1, an electric motor control unit (MOT/ECU) 12 for controlling the electric motor 3, a management control unit (MG/ECU) 15 for carrying out output power distributions of the engine 1 and the electric motor 3 depending on the remaining capacity of the capacitor 14, etc., and a transmission control unit (TM/ECU) 16 for controlling the transmission mechanism 4. These ECUs 11–16 are connected to each other by a data bus 21 for exchanging detected data, flag data, and other data through the data bus 21.

Figure 2:
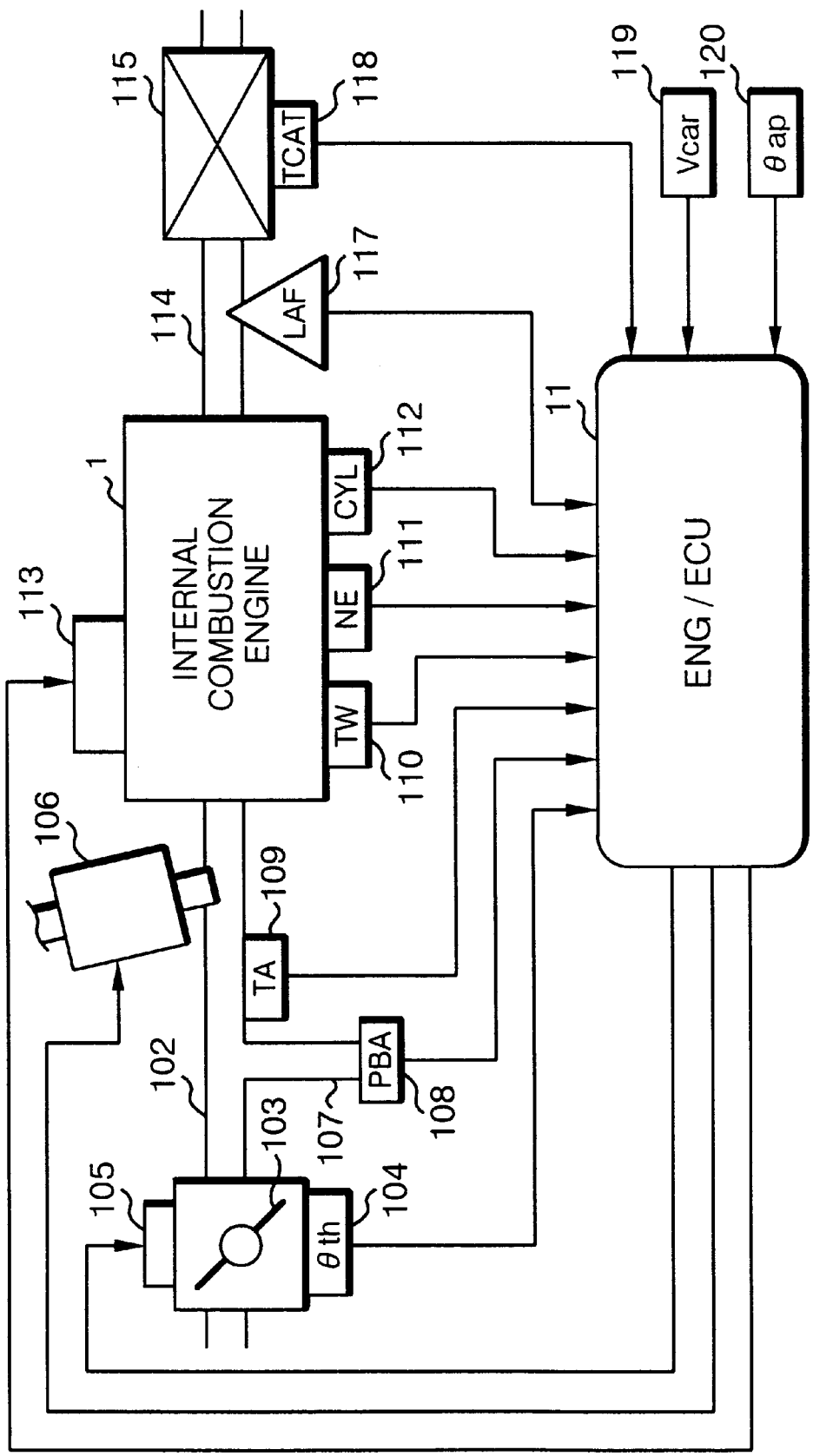
FIG. 2 is a block diagram of an engine control arrangement of the control system.

FIG. 2 shows the engine 1, the ENG/ECU 11, and ancillary devices thereof. A throttle valve 103 is mounted in an intake pipe 102 connected to the engine 1, and a throttle valve opening sensor 104 is coupled to the throttle valve 103 for generating an electric signal representative of the opening θth of the throttle valve 103 and supplying the generated electric signal to the ENG/ECU 11. A throttle actuator 105 for electrically controlling the opening θth of the throttle valve 103 is coupled to the throttle valve 103, which is of the drive-by-wire (DBW) type. The throttle actuator 105 is controlled for its operation by the ENG/ECU 11.

Fuel injection valves 106 are mounted in the intake pipe 102 at respective positions downstream of the throttle valve 103 and slightly upstream of respective intake valves (not shown) disposed respectively in the cylinders of the engine 1. The fuel injection valves 106 are connected through a pressure regulator (not shown) to a fuel tank (not shown). The fuel injection valves 106 are electrically connected to the ENG/ECU 11, which applies command signals to the fuel injection valves 106 to control times to open and close the fuel injection valves 106. The amount of fuel injected into each of the cylinders of the engine 1 by controlling the time to open the corresponding fuel injection valve 106.

An intake pressure sensor 108 for detecting an intake pressure PBA in the intake pipe 102 (specifically, the absolute pressure of intake air in the intake pipe 102) is connected to the intake pipe 102 through a pipe 107 immediately downstream of the throttle valve 103. The intake pressure sensor 108 generates an electric signal representative of the absolute pressure PBA in the intake pipe 102, and supplies the generated signal to the ENG/ECU 11.

An intake temperature sensor 109 for detecting an intake air temperature TA in the intake pipe 102 is mounted on the intake pipe 102 downstream of the intake pressure sensor 108. The intake temperature sensor 109 generates an electric signal representative of the intake air temperature TA and supplies the generated signal to the ENG/ECU 11.

An engine coolant temperature sensor 110 for detecting a coolant temperature TW of the engine 1 is mounted on the cylinder block of the engine 1. The engine coolant temperature sensor 110, which may comprise a thermistor or the like, generates an electric signal representative of an engine coolant temperature TW and supplies the generated signal to the ENG/ECU 11.

An engine rotational speed sensor 111 for detecting a rotational speed NE of the engine 1 is mounted near a camshaft or crankshaft (output shaft) of the engine 1. The engine rotational speed sensor 111 generates a signal pulse at a predetermined crankshaft angle (hereinafter referred to as a "TDC signal pulse") each time the crankshaft of the engine 1 makes a 180° turn, and supplies the TDC signal pulse as a detected signal representative of the rotational speed NE of the engine 1 to the ENG/ECU 11.

A sensor 112 for detecting a rotational angle of the crankshaft of the engine 1 is mounted on the internal combustion engine 1. The sensor 112 generates a pulse each time the crankshaft turns through a predetermined angle. A pulse signal generated by the sensor 112 is supplied as a signal representative of a rotational angle of the crankshaft of the engine 1, to the ENG/ECU 11, which identifies an engine cylinder into which fuel is to be injected or in which the injected fuel is to be ignited, based on the supplied pulse signal.

The engine 1 has ignition plugs 113 positioned at the respective cylinders for igniting the fuel in the cylinders. The ignition plugs 113 are electrically connected to the ENG/ECU 11, which controls the ignition timing of the ignition plugs 113.

A three-way catalytic converter 115 for purifying toxic components, including HC, CO, NOx, etc. of exhaust gases emitted from the engine 1 is mounted in an exhaust pipe 114 connected to the engine 1. An air-fuel ratio sensor 117 for detecting an air-fuel ratio LAF of an air-fuel mixture burned in the engine 1 is mounted on the exhaust pipe 114 upstream of the three-way catalytic converter 115. The air-fuel ratio sensor 117 generates an electric signal substantially proportional to the concentration of oxygen in the exhaust gases, and supplies the generated signal as a detected signal representative of an air-fuel ratio LAF of an air-fuel mixture to the ENG/ECU 11. The air-fuel ratio sensor 117 can detect the air-fuel ratio LAF of the air-fuel mixture burned in the engine 1 through a wide range of air-fuel ratios ranging from a theoretical air-fuel ratio to lean and rich values.

A catalyst temperature sensor 118 is mounted on the three-way catalytic converter 115 for detecting a temperature TCAT thereof. The catalyst temperature sensor 118 supplies an electric signal representative of the detected temperature TCAT to the ENG/ECU 11. A vehicle speed sensor 119 for detecting the speed Vcar of the hybrid vehicle and an accelerator opening sensor 120 for detecting the depression θap (hereinafter referred to as an "accelerator opening θap") of the accelerator pedal are electrically connected to the ENG/ECU 11. Electric signals generated by the vehicle speed sensor 119 and the accelerator opening sensor 120 are supplied to the ENG/ECU 11.

The ENG/ECU 11 comprises an input circuit for shaping the waveforms of input signals (detected signals) from the above various sensors, correcting the voltage levels thereof into predetermined levels, and converting analog signals into digital signals, a central processing unit (hereinafter referred to as a "CPU"), a memory for storing various processing programs to be executed by the CPU and various processed results, and an output circuit for supplying drive signals to the fuel injection valves 106, the ignition plugs 113, and the throttle actuator 105. The other ECUs 12–16 are structurally similar to the ENG/ECU 11.

Figure 3:
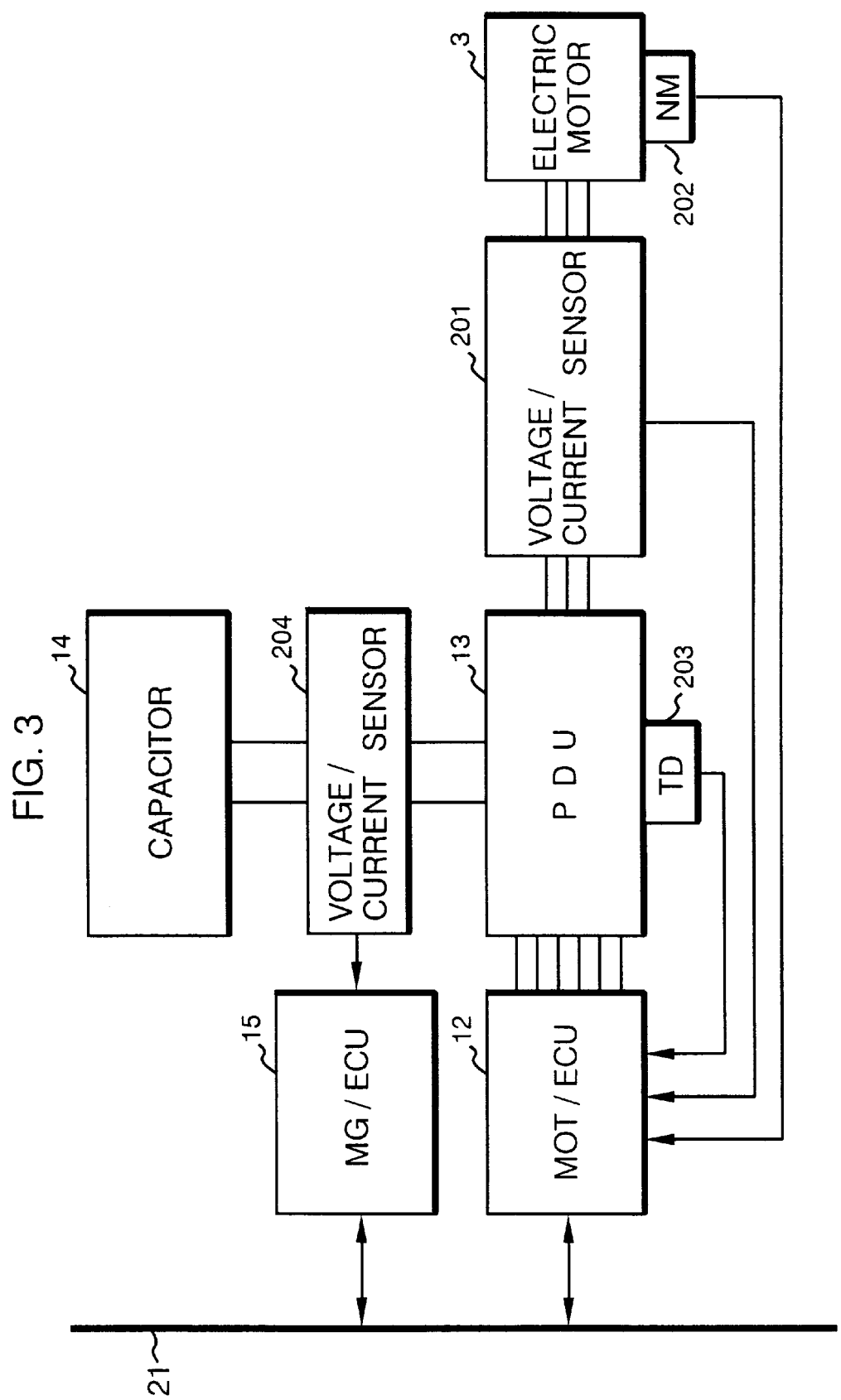
FIG. 3 is a block diagram of an electric motor control arrangement of the control system.

FIG. 3 shows a connected arrangement of the electric motor 3, the PDU 13, the capacitor 14, the MOT/ECU 12, and the MG/ECU 15.

As shown in FIG. 3, the electric motor 3 is associated with an electric motor rotational speed sensor 202 for detecting a rotational speed NM of the electric motor 3. An electric signal generated by the electric motor rotational speed sensor 202 as representing the detected rotational speed NM of the electric motor 3 is supplied to the MOT/ECU 12. Since the rotational speed NM of the electric motor 3 is equal to the rotational speed NE of the engine 1, the detected signal from the engine rotational speed sensor 111 instead of the detected signal from the electric motor rotational speed sensor 202 may be supplied to the MOT/ECU 12.

The PDU 13 and the electric motor 3 are interconnected by wires connected to a voltage/current sensor 201 which detects a voltage and a current supplied to or outputted from the electric motor 3. A temperature sensor 203 for detecting a temperature TD of the PDU 13, e.g., a temperature TD of a protective resistor of for the electric motor 3 or a temperature TD of an IGBT module (switching circuit), is mounted on the PDU 13. Detected signals from the sensors 201, 203 are supplied to the MOT/ECU 12.

The capacitor 14 and the PDU 13 are interconnected by wires connected to a voltage/current sensor 204 for detecting a voltage across the capacitor 14 and a current outputted from or supplied to the capacitor 14. A detected signal from the voltage/current sensor 204 is supplied to the MG/ECU 15.

The MG/ECU 15 in combination with the MOT/ECU 12 functions as a decelerating regenerative control means. The MG/ECU 15 functions as a remaining capacity detecting means and a discharged quantity integrating means.

Figure 4:
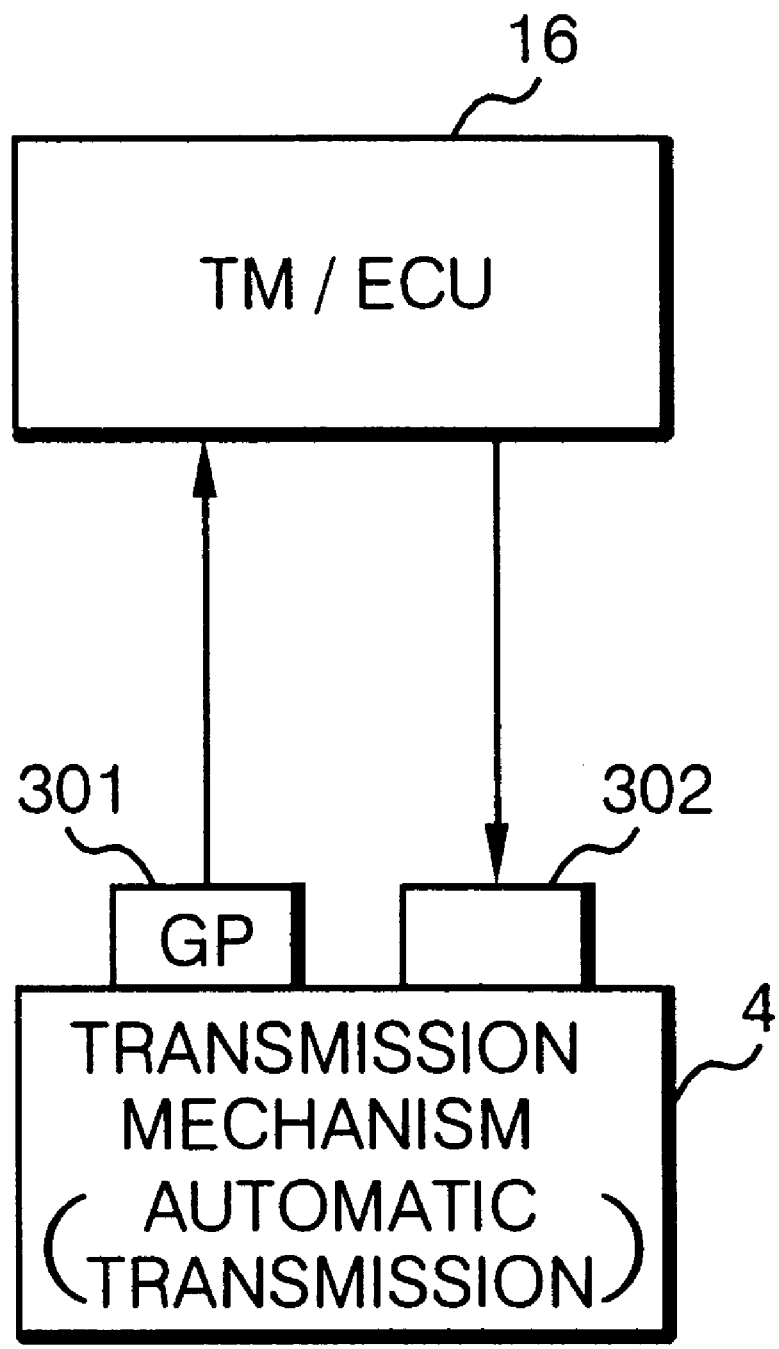
FIG. 4 is a block diagram of a transmission control arrangement of the control system.

FIG. 4 shows a connected arrangement of the transmission mechanism 4 and the TM/ECU 16. The transmission mechanism 4 is associated with a gear position sensor 301 for detecting a gear position (speed reduction ratio) GP of the transmission mechanism 4. A detected signal from the gear position sensor 301 is supplied to the TM/ECU 16. In the illustrated embodiment, the transmission mechanism 4 comprises an automatic transmission mechanism, and is also associated with a transmission actuator 302 which is controlled by the TM/ECU 16 to change gear positions of the transmission mechanism 4.

Figure 5:
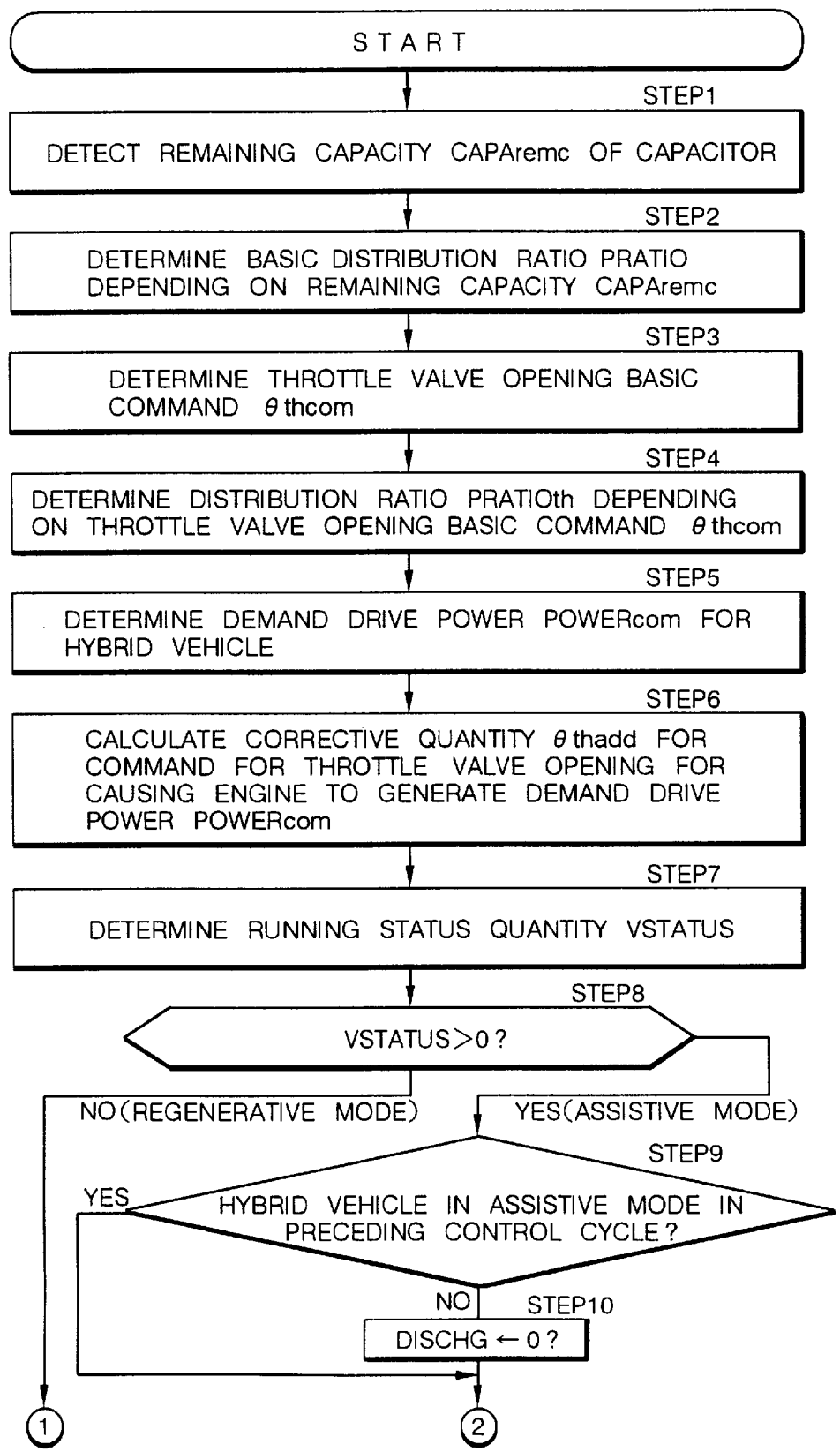
FIGS. 5 and 6 are a flowchart of a processing sequence of the control system.
Figure 6:
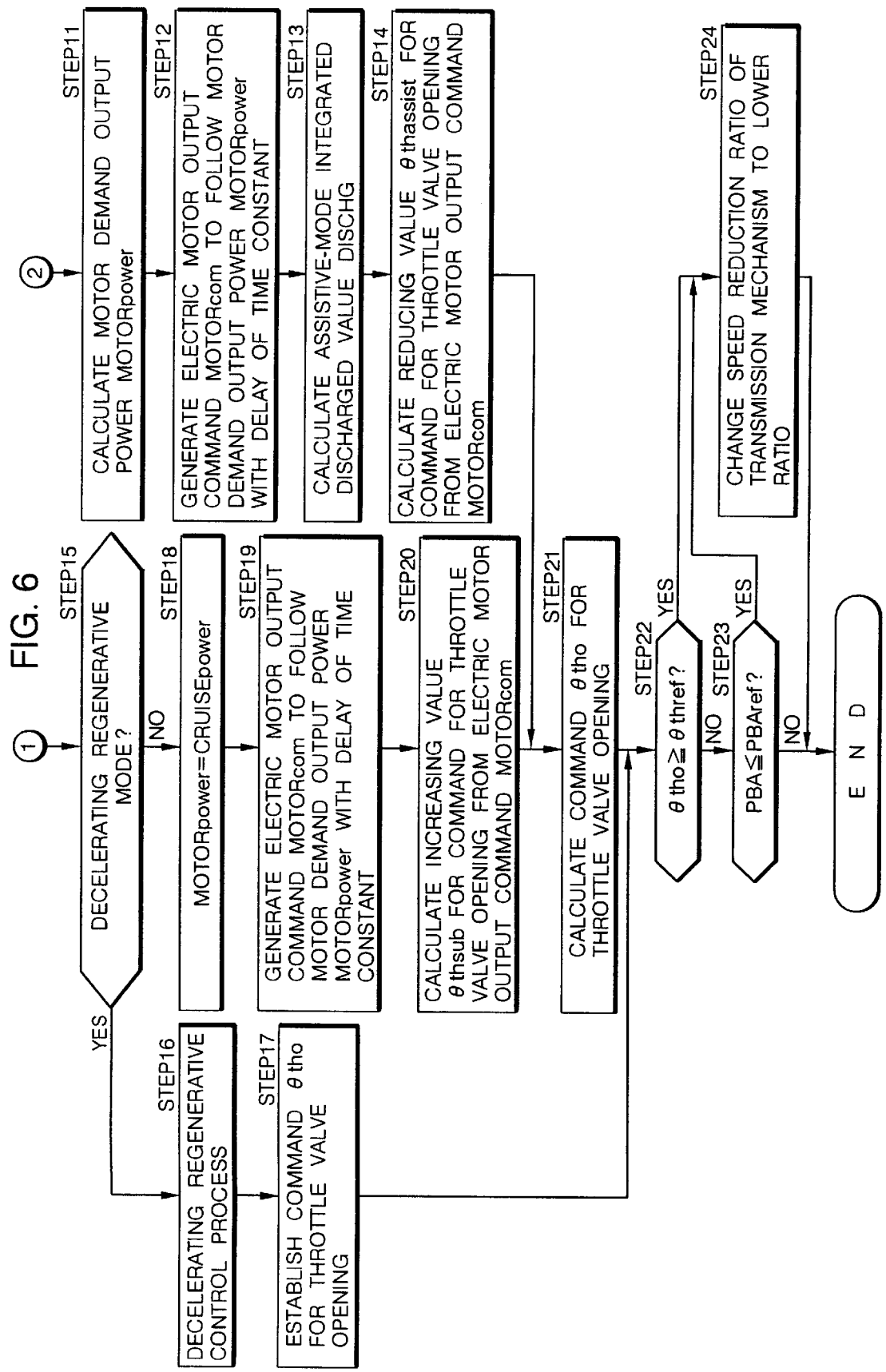

FIGS. 5 and 6 show a processing sequence for determining output power distributions for the electric motor 3 and the engine 1 with respect to a demand drive power, i.e., how a drive power demanded by the driver of the hybrid vehicle is to be distributed to the electric motor 3 and the engine 1. The processing sequence shown in FIGS. 5 and 6 is executed by the MG/ECU 15 in each periodic cycle (e.g., 1 msec.). However, the processing sequence shown in FIGS. 5 and 6 may be executed by the MOT/ECU 12.

In FIG. 5, the MG/ECU 15 detects a remaining capacity CAPAremc of the capacitor 14 in STEP1.

Specifically, the MG/ECU 15 integrates (accumulates) an output current (discharging current) from the capacitor 14 and an input current (charging current) to the capacitor 14, which are detected by the voltage/current sensor 204, at each periodic interval from a fully charged state of the capacitor 14, and calculates an integrated discharged value CAPAdisch as a total discharged quantity and an integrated charged value CAPAchg as a total charged quantity. In this embodiment, the integrated discharged value CAPAdisch is a positive value, and the integrated charged value CAPAchg is a negative value. The MG/ECU 15 then calculates a basic remaining capacity CAPArem of the capacitor 14 from the integrated discharged value CAPAdisch and the integrated charged value CAPAchg according to the following equation (1):

$$CAPArem = CAPAfull - (CAPAdisch + CAPAchg) \quad (1)$$

where CAPAfull represents a dischargeable quantity when the capacitor 14 is fully charged.

The MG/ECU 15 corrects the calculated remaining capacity CAPArem based on the internal resistance of the capacitor 14 which varies with temperature, etc., thereby finally determining a remaining capacity CAPAremc of the capacitor 14. The corrected remaining capacity CAPAremc is represented as a proportion with respect to the dischargeable quantity CAPAfull of the capacitor 14 when it is fully charged.

The integrated discharged value CAPAdisch and the integrated charged value CAPAchg used in the equation (1) are stored in a nonvolatile memory such as an EEPROM or the like (not shown) when the capacitor 14 is neither discharged nor charged as well as the hybrid vehicle is not operating. The integrated discharged value CAPAdisch and the integrated charged value CAPAchg are reset to "0" when the capacitor 14 is fully charged.

Instead of calculating the remaining capacity of the capacitor 14 using the integrated discharged value CAPAdisch and the integrated charged value CAPAchg, an open-circuit voltage across the capacitor 14, i.e., an output voltage of the capacitor 14 when it is disconnected, may be detected, and the remaining capacity of the capacitor 14 may be estimated from the detected open-circuit voltage.

In STEP2, the MG/ECU 15 determines an output power to be generated by the electric motor 3 depending on the remaining capacity CAPAremc of the capacitor 14 when the electric motor 3 assists in rotating the drive axle and hence running the hybrid vehicle, more specifically, the proportion PRATIO of a drive power to be generated by the electric motor 3, in a demand drive power POWERcom for the hybrid vehicle which will subsequently be determined in STEP 5, using a predetermined data table shown in FIG. 7. The proportion of the drive power of the electric motor 3 with respect to the demand drive power POWERcom for the hybrid vehicle will hereinafter be referred to as a "distribution ratio", and the distribution ratio PRATIO depending on the remaining capacity CAPAremc of the capacitor 14 will hereinafter be referred to as a "basic distribution ratio PRATIO".

Figure 7:
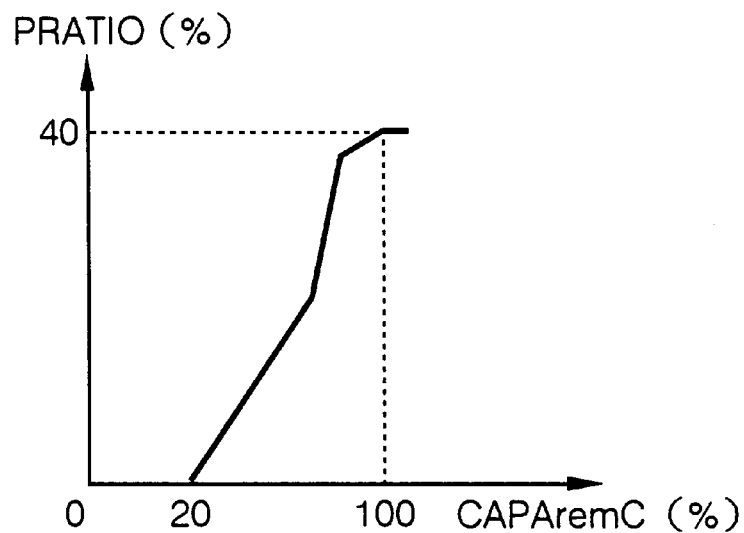
FIG. 7 is a diagram showing a data table for determining a basic distribution ratio.

The data table shown in FIG. 7 is in the form of a graph which has a horizontal axis representing the remaining capacity CAPAremc of the capacitor 14 and a vertical axis representing the basic distribution ratio PRATIO. The data table contains values of the basic distribution ratio PRATIO established with respect to values of the remaining capacity CAPAremc such that the capacitor 14 will be discharged most efficiently when the electric motor 3 assists in running the hybrid vehicle.

In STEP3, the MG/ECU 15 searches a predetermined data table shown in FIG. 8 for a basic command $\theta$thcom (hereinafter referred to as a "throttle valve opening basic command $\theta$thcom") for the throttle valve opening $\theta$th to be given to the throttle actuator 105 depending on an accelerator opening $\theta$ap.

Figure 8:
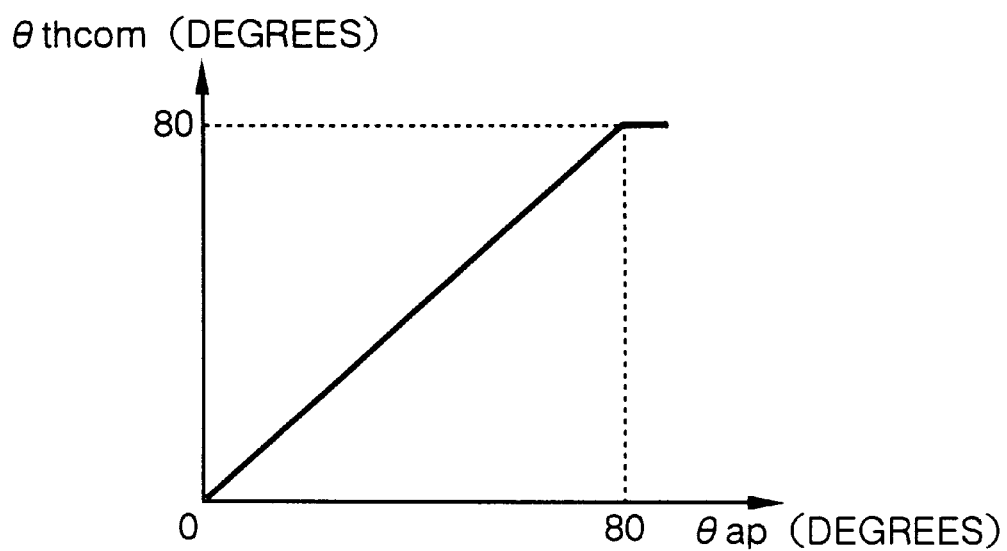
FIG. 8 is a diagram showing a data table for determining a throttle valve opening basic command.

In FIG. 8, values of the accelerator opening $\theta$ap are equal to corresponding values of the throttle valve opening basic command $\theta$thcom ($\theta$thcom=$\theta$ap). However, values of the accelerator opening $\theta$ap may be different from corresponding values of the throttle valve opening basic command $\theta$thcom.

Figure 9:
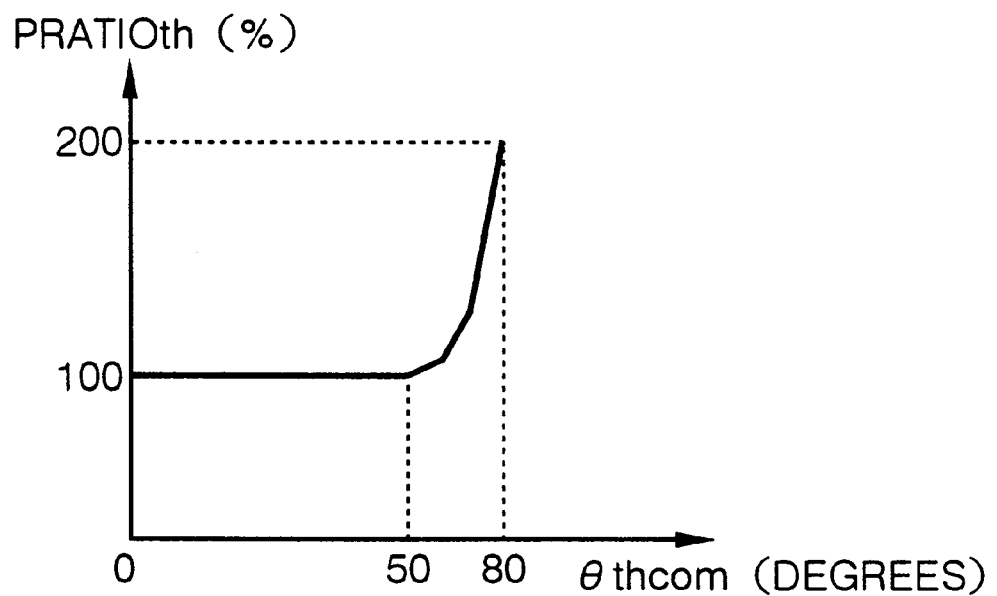
FIG. 9 is a diagram showing a data table for determining a distribution ratio.

In STEP4, the MG/ECU 15 searches a predetermined data table shown in FIG. 9 for a distribution ratio PRATIOth for the drive power of the electric motor 3 depending on the determined throttle valve opening basic command $\theta$thcom. The distribution ratio PRATIOth serves to correct the distribution ratio of the drive power of the electric motor 3 with respect to the demand drive power POWERcom for the hybrid vehicle by multiplying the basic distribution ratio PRATIO.

In the data table shown in FIG. 9, values of the distribution ratio PRATIOth are established such that the drive power (output power) of the electric motor 3 is increased when the throttle valve opening basic command $\theta$thcom is in the vicinity of a fully open throttle valve value (e.g., 50 degrees or higher), i.e., when the hybrid vehicle demands a large acceleration.

While the distribution ratio PRATIOth is determined depending on the throttle valve opening basic command $\theta$thcom in the illustrated embodiment, the distribution ratio PRATIOth may be determined depending on the accelerator opening $\theta$ap. Alternatively, the distribution ratio PRATIOth may be determined depending on one or more parameters including the vehicle speed and the engine rotational speed.

In STEP5, the MG/ECU 15 searches a map shown in FIG. 10 for a demand drive power POWERcom for the hybrid vehicle, i.e., a drive power POWERcom which the driver of the hybrid vehicle demands by depressing the accelerator pedal, depending on the throttle valve opening basic command $\theta$thcom determined in STEP3 and the present engine rotational speed NE detected by the engine rotational speed 111.

The demand drive power POWERcom determined from the map shown in FIG. 10 represents an overall hybrid vehicle drive power, i.e., the sum of the drive power from the engine 1 and the drive power from the electric motor 3, which is demanded depending on the throttle valve opening basic command $\theta$thcom and the engine rotational speed NE. The demand drive power POWERcom may not necessarily be the same as a drive power which is outputted by the engine 1 when the engine 1 is actually operated with a throttle valve opening $\theta$th equal to the throttle valve opening basic command $\theta$thcom (basically, the demand drive power POWERcom is greater than the drive power which is outputted by the engine 1 when the engine 1 is actually operated with the throttle valve opening $\theta$th equal to the throttle valve opening basic command $\theta$thcom.). The demand drive power POWERcom is "0" when the throttle valve opening basic command $\theta$thcom is approximately "0", i.e., when the accelerator opening $\theta$ap is approximately "0".

In this embodiment, since the throttle valve opening basic command $\theta$thcom is in a one-to-one correspondence to the accelerator opening $\theta$ap, the accelerator opening $\theta$ap instead of the throttle valve opening basic command $\theta$thcom may be used to determine the demand drive power POWERcom.

In STEP6, the MG/ECU 15 calculates a corrective quantity θthadd for correcting the command for the throttle valve opening θth for enabling the engine 1 to generate the demand drive power POWERcom, from the throttle valve opening basic command θthcom. The corrective quantity θthadd is a corrective quantity for the command for the throttle valve opening θth, to be added to the throttle valve opening basic command θthcom in order to equalize the drive power outputted by the engine 1 to the demand drive power POWERcom. Specifically, the corrective quantity θthadd is determined such that when the throttle valve opening θth is controlled according to a command (=θthcom+θthadd) produced by adding the corrective quantity θthadd to the throttle valve opening basic command θthcom, the drive power outputted by the engine 1 is equalized to the demand drive power POWERcom.

In STEP7, the MG/ECU 15 searches a map shown in FIG. 11, for a running status quantity VSTATUS of the hybrid vehicle depending on the vehicle speed Vcar and an extra output power EXPOWER (described below) of the engine 1 from the present vehicle speed Vcar detected by the vehicle speed sensor 119 and the extra output power EXPOWER.

The extra output power EXPOWER of the engine 1 is calculated from the demand drive power POWERcom determined in STEP5 and a running resistance RUNRST of the hybrid vehicle depending on the vehicle speed Vcar, which is determined from a data table (not shown) from the present vehicle speed Vcar, according to the following equation (2):

$$\text{EXPOWER} = \text{POWERcom} - \text{RUNRST} \qquad (2)$$

The running resistance RUNRST is the same as a drive power which is necessary to keep the hybrid vehicle running at the present vehicle speed Vcar.

The extra output power EXPOWER is produced by subtracting the running resistance RUNRST depending on the present vehicle speed Vcar from the demand drive power POWERcom. If the extra output power EXPOWER is positively greater, then it means that a greater acceleration is required for the hybrid vehicle.

If the extra output power EXPOWER has a negative value, specifically, if it is smaller than a predetermined negative value, then it means that a deceleration is required for the hybrid vehicle. If the extra output power EXPOWER has a value near "0", then it means that a cruise mode (constant-speed mode) is required for the hybrid vehicle.

In this embodiment, each of the demand drive power POWERcom and the running resistance RUNRST is expressed in the unit of KW (kilowatts).

The running status quantity VSTATUS determined from the present vehicle speed Vcar and the extra output power EXPOWER according to the map shown in FIG. 11 serves to determine a distribution ratio for the drive power of the electric motor 3 depending on a loaded state of the hybrid vehicle which corresponds to the extra output power EXPOWER and the present vehicle speed Vcar when the electric motor 3 assists in running the hybrid vehicle, and has a value ranging from 0 to 200%. When the running status quantity VSTATUS multiplies the basic distribution ratio PRATIO, it corrects the distribution ratio for the drive power of the electric motor 3 with respect to the demand drive power POWERcom for the hybrid vehicle, depending on the loaded state of the hybrid vehicle.

Since a larger acceleration is required for the hybrid vehicle as the extra output power EXPOWER is greater, the map shown in FIG. 11 is established such that the running status quantity VSTATUS is greater as the extra output power EXPOWER is greater. Since an acceleration required for the hybrid vehicle with respect to the extra output power EXPOWER is smaller as the vehicle speed Vcar is greater, the map shown in FIG. 11 is established such that the running status quantity VSTATUS is smaller as the vehicle speed Vcar is greater.

The running status quantity VSTATUS also serves to decide whether the electric motor 3 is to assist in running the hybrid vehicle or not. Specifically, the running status quantity VSTATUS is set to VSTATUS=0 when the extra output power EXPOWER calculated according to the equation (2) is of a negative value or a value close to "0" (the demand drive power POWERcom is smaller than or substantially equal to the running resistance RUNRST) as when the accelerator pedal is released (θap=0). The running status quantity VSTATUS is set to VSTATUS>0 when the extra output power EXPOWER is positively greater than the value close to "0" (the demand drive power POWERcom is greater than the running resistance RUNRST by a certain value).

Therefore, if the running status quantity VSTATUS is "0", it means that the electric motor 3 is not to assist in running the hybrid vehicle (the hybrid vehicle is required to decelerate or cruise), and if the running status quantity VSTATUS is greater than "0", the electric motor 3 is to assist in running the hybrid vehicle (the hybrid vehicle is required to accelerate).

In STEP8, the MG/ECU 15 decides whether the running status quantity VSTATUS is greater than "0" or not. If VSTATUS>0, i.e., if the hybrid vehicle is in a running status to be assisted by the electric motor 3, then the hybrid vehicle enters an assistive mode, and the MG/ECU 15 decides whether the hybrid vehicle was in the assistive mode in the preceding control cycle or not in STEP9. Specifically, the MG/ECU 15 makes this decision by deciding, for example, whether the running status quantity VSTATUS determined in STEP7 in the preceding control cycle is greater than "0" or not. If the hybrid vehicle was not in the assistive mode in the preceding control cycle in STEP9, then the MG/ECU 15 initializes a parameter DISCHG (hereinafter referred to as an "assistive-mode integrated discharged value DISCHG"), which represents an integrated value of electric energy discharged from the capacitor 14 by the electric motor 3 in the assistive mode, to "0" in STEP10. Then, control goes to STEP11 shown in FIG. 6. If the hybrid vehicle was in the assistive mode in the preceding control cycle in STEP9, then the assistive-mode integrated discharged value DISCHG is kept at the present value, and control goes to STEP11 shown in FIG. 6. Therefore, the assistive-mode integrated discharged value DISCHG is initialized to "0" each time the assistive mode starts.

If VSTATUS≦0 in STEP8, i.e., if the hybrid vehicle is to decelerate or cruise, then the hybrid vehicle enters a regenerative mode in which the electric motor 3 regenerates electric energy, and control goes from STEP8 to STEP15 shown in FIG. 6.

The cruise mode while the hybrid vehicle is decelerating will hereinafter be referred to as a decelerating regenerative mode, and the cruise mode while the hybrid vehicle is cruising will hereinafter be referred to as or a cruising degenerative mode.

In STEP11 which is executed if the hybrid vehicle is in a running status to be assisted by the electric motor 3 (VSTATUS>0), the MG/ECU 15 calculates a demand output power MOTORpower for the electric motor 3 (hereinafter referred to as a "motor demand output power MOTORpower") from the demand drive power POWERcom determined in STEP5, the basic distribution ratio PRATIO determined in STEP2, the distribution ratio PRATIOth determined in STEP4, and the running status quantity VSTATUS determined in STEP7, according to the following equation (3):

$$MOTORpower = POWERcom \times PRATIO \times PRATIOth \times VSTATUS \quad (3)$$

In STEP12, the MG/ECU 15 generates a command MOTORcom for the output power (drive power) of the electric motor 3 (hereinafter referred to as a "motor output power command MOTORcom") in order to follow the motor demand output power MOTORpower with the delay of a given time constant.

Figure 12:
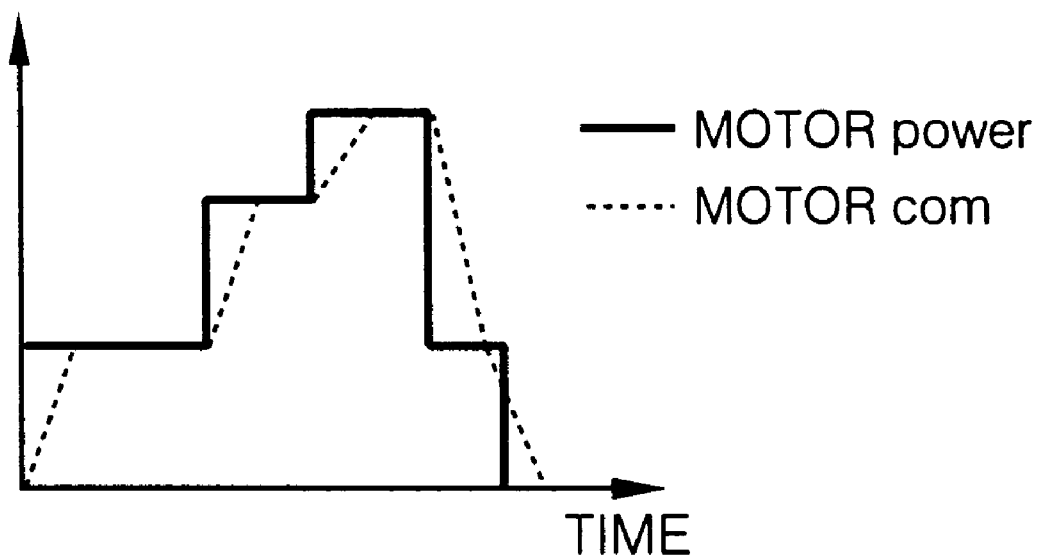
FIG. 12 is a diagram showing the relationship between a motor output power POWERmot and a motor demand output power MOTORpower.

FIG. 12 shows the relationship between the motor output power command MOTORcom thus generated and the motor demand output power MOTORpower. In FIG. 12, the solid-line curve illustrates the motor demand output power MOTORpower as it changes with time, and the dotted-line curve illustrates the motor output power command MOTORcom as it changes with time.

As can be seen from FIG. 12, the motor output power command MOTORcom is generated so as to follow the motor demand output power MOTORpower with the delay of a certain time constant. The reason for this is as follows: If the output power of the electric motor 3 were controlled according to the motor demand output power MOTORpower, then when the motor demand output power MOTORpower would change, because a change in the output power (drive power) of the engine 1 would be delayed, the output power of the electric motor 3 and the output power of the engine 1 would not immediately match each other, with the result that the drivability of the hybrid vehicle would be impaired. In order to eliminate the above drawback, in view of the response delay of the output power of the engine 1, the motor output power command MOTORcom is given the delay of a certain time constant compared with the motor demand output power MOTORpower.

In this embodiment, each of the motor demand output power MOTORpower and the motor output power command MOTORcom is of a positive value when the electric motor 3 is to assist in running the hybrid vehicle, and of a negative value when the electric motor 3 is to regenerate electric energy. Therefore, the motor demand output power MOTORpower and the motor output power command MOTORcom which are of a positive value serve as commands for the drive power of the electric motor 3, and the motor demand output power MOTORpower and the motor output power command MOTORcom which are of a negative value serve as commands for the amount of electric energy regenerated by the electric motor 3.

The motor output power command MOTORcom thus generated is supplied from the MG/ECU 15 to the MOT/ECU 12. The MOT/ECU 12 controls the output power (drive power) of the electric motor 3 through the PDU 13 according to the supplied motor output power command MOTORcom.

In STEP13, in the same manner as to determine the integrated discharged value CAPAdisch used to detect the remaining capacity CAPAremc of the capacitor 14, the MG/ECU 15 integrates (accumulates) an output current (discharging current) from the capacitor 14, which is detected by the voltage/current sensor 204, at each periodic interval to determine an assistive-mode integrated discharged value DISCHG, i.e., an integrated value DISCHG of electric energy discharged from the capacitor 14 while the electric motor 3 is assisting in running the hybrid vehicle per assistive mode.

When the assistive mode is finished, the assistive-mode integrated discharged value DISCHG at the end of the assistive mode is held until the assistive mode is resumed next time.

In STEP14, the MG/ECU 15 calculates a corrective quantity (reducing value) θthassist for correcting a command for the throttle valve opening θth in a valve closing direction, depending on the motor output power command MOTORcom determined in STEP12. Thereafter, control goes from STEP11 to STEP21.

The corrective quantity θthassist serves to correct a command for the throttle valve opening θth in a valve closing direction in order to reduce the output power of the engine 1 by an output power (drive power) to be generated by the electric motor 3 according to the motor output power command MOTORcom. Specifically, the corrective quantity θthassist is subtracted from the sum (=θthcom+θthadd) of the throttle valve opening basic command θthcom determined in STEP3 and the corrective quantity θthadd determined in STEP6 for thereby reducing a command for the throttle valve opening θth which will finally be given to the throttle actuator 105. The corrective quantity θthassist is calculated for the following reasons:

When a final command for the throttle valve opening θth is determined as the sum of the throttle valve opening basic command θthcom determined in STEP3 and the corrective quantity θthadd determined in STEP6 and the throttle valve opening θth is controlled according to the final command (=θthcom+θthadd), the demand drive power POWERcom is generated solely from the output power of the engine 1. Therefore, if the electric motor 3 were controlled by the motor output power command MOTORcom determined in STEP10, the sum of the output power (drive power) of the engine 1 and the output power (drive power) of the electric motor 3 would exceed the demand drive power POWERcom, resulting in a drive power greater than the drive power demanded by the driver. To avoid this problem, the corrective quantity θthassist is calculated in order to reduce the output power of the engine 1 by an output power to be generated by the electric motor 3 and equalize the sum of the output power of the electric motor 3 and the output power of the engine 1 to the demand drive power POWERcom.

In STEP15, the MG/ECU 15 decides whether the present regenerative mode is the decelerating regenerative mode or not, i.e., whether the hybrid vehicle is required to decelerate or not. Specifically, the MG/ECU 15 makes such a mode decision based on the extra output power EXPOWER used to determine the running quantity status VSTATUS in STEP7, i.e., decides whether EXPOWER<0 or not (or more preferably smaller than a given negative value near 0 or not). Alternatively, the MG/ECU 15 may decide whether a change DAP in the accelerator opening θap per unit time is smaller than a predetermined negative quantity DAPD or not. According to this alternative, if DAP<DAPD, then the MG/ECU 15 determines that the present regenerative mode is the decelerating regenerative mode, and if DAP≧DAPD, then the MG/ECU 15 determines that the present regenerative mode is the cruising regenerative mode.

Figure 13:
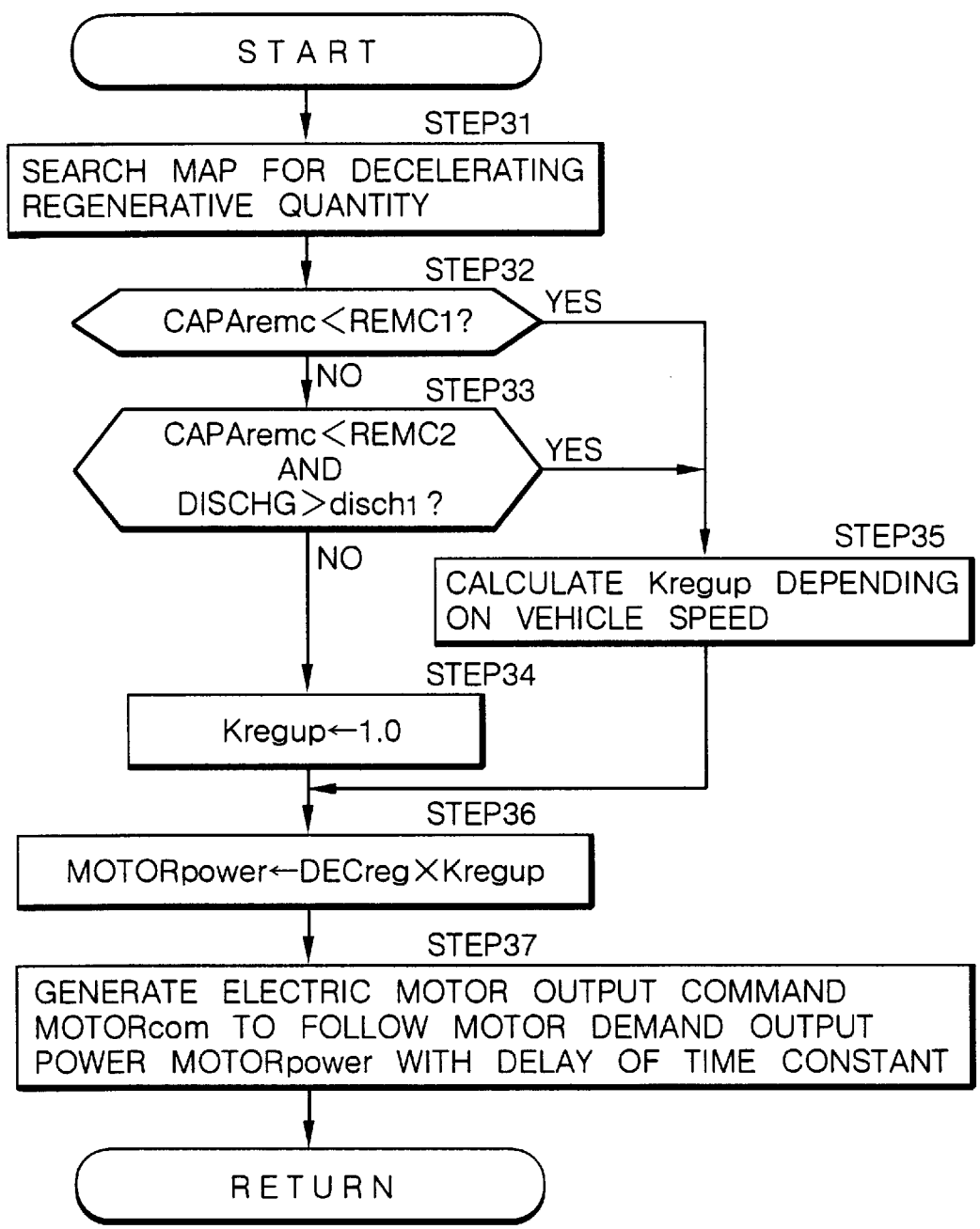
FIG. 13 is a flowchart of a decelerating regenerative control process in the processing sequence shown in FIG. 6.

If the extra output power EXPOWER is smaller than 0 (or smaller than a given negative value near 0) in STEP15, then since the demand drive power POWERcom is smaller than the running resistance RUNRST and the hybrid vehicle is required to decelerate, the MG/ECU 15 judges the present regenerative mode as the decelerating regenerative mode in which the hybrid vehicle decelerates and the electric motor 3 regenerates electric energy, and executes an decelerating regenerative control process shown in FIG. 13 in STEP16.

The decelerating regenerative control process shown in FIG. 13 will be described below. In STEP31 shown in FIG. 13, the MG/ECU 15 searches a map (not shown) for a basic amount DECreg (which is of a negative value, and will hereinafter be referred to as a "decelerating regenerative quantity DECreg") of electric energy regenerated by the electric motor 3 depending on the vehicle speed Vcar and the rotational speed NE of the engine 1 (=the rotational speed NM of the electric motor 3). The map is established such that the absolute value of the decelerating regenerative quantity DECreg increases as the vehicle speed Vcar increases and the engine rotational speed NE increases.

Figure 14:
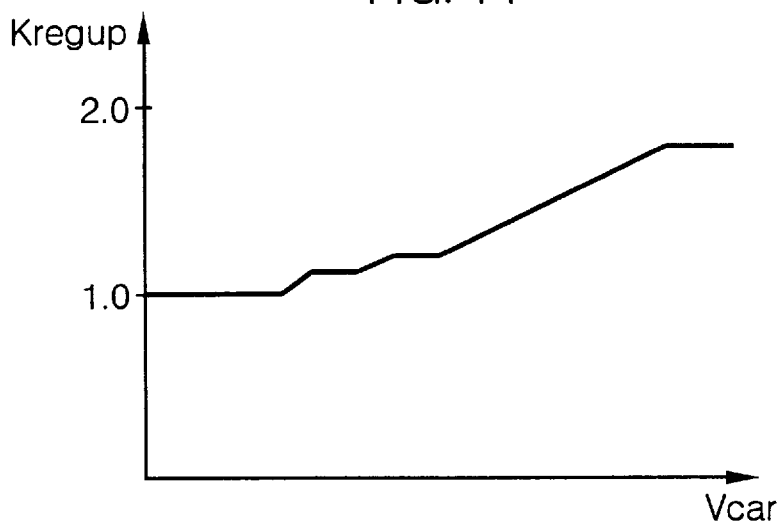
FIG. 14 is a diagram showing a data table used in the decelerating regenerative control process shown in FIG. 13.

Then, the MG/ECU 15 decides whether the present remaining capacity CAPAremc of the capacitor 14 detected in STEP1 is smaller than a first predetermined remaining capacity REMC1 or not in STEP32. If CAPAremc≧REMC1, then the MG/ECU 15 decides whether the remaining capacity CAPAremc is smaller than a second predetermined remaining capacity REMC2, which is greater than the first predetermined remaining capacity REMC1 or not, and whether the assistive-mode integrated discharged value DISCHG determined in STEP13 in the preceding assistive mode (while the hybrid vehicle is operating the latest assistive mode prior to the present decelerating regenerative mode) is greater than a predetermined discharged quantity disch1 or not in STEP33. If CAPAremc<REMC1 or if REMC1<CAPAremc<REMC2 and DISCHG>disch1, then the MG/ECU 15 searches a data table shown in FIG. 14 for a corrective coefficient Kregup (hereinafter referred to as a "regenerated quantity increasing corrective coefficient Kregup") for increasing the amount of electric energy regenerated by the electric motor 3, depending on the present vehicle speed Vcar in STEP35. The regenerated quantity increasing corrective coefficient Kregup serves to increase the amount of electric energy regenerated by the electric motor 3 by multiplying the decelerating regenerative quantity DECreg which is a basic amount of regenerated electric energy determined in STEP31. The data table shown in FIG. 14 is established such that the regenerated quantity increasing corrective coefficient Kregup is of a value of "1.0" or greater and increases as the vehicle speed Vcar increases.

Figure 15:
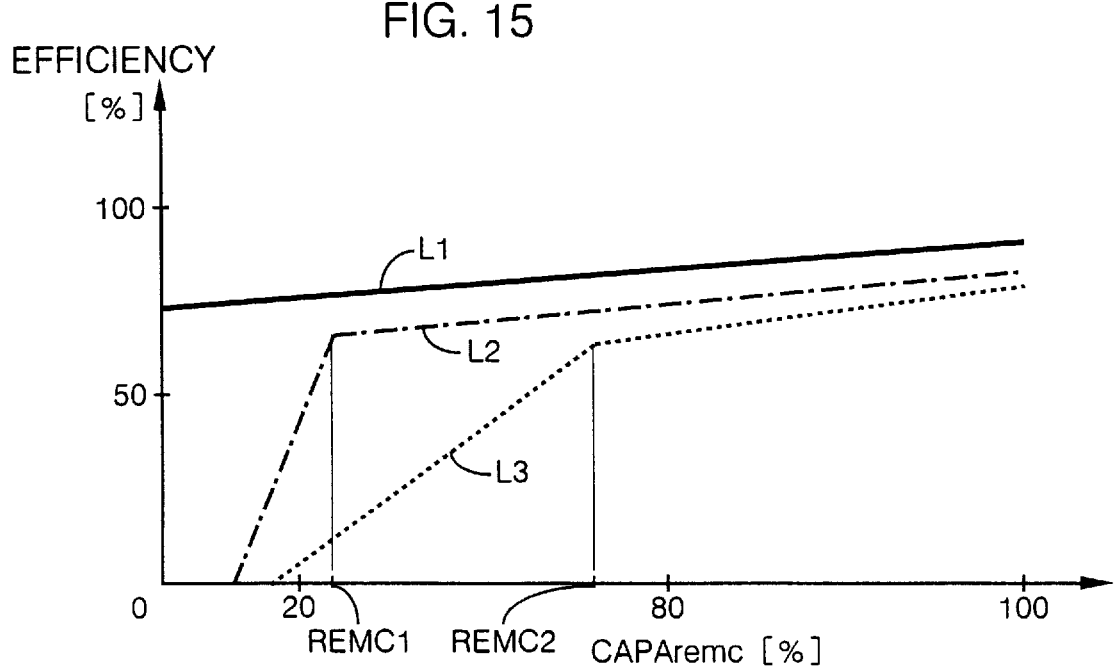
FIG. 15 is a diagram illustrative of parameters used in the decelerating regenerative control process shown in FIG. 13.

Determination of the first predetermined remaining capacity REMC1 and the second predetermined remaining capacity REMC2 in the illustrated embodiment will be described below with reference to FIG. 15. In FIG. 15, the solid-line curve L1 represents a charging and discharging efficiency of the capacitor 14, the dot-and-dash-line curve L2 represents a driving efficiency of the electric motor 3 when it assists in running the hybrid vehicle, and the broken-line curve L3 represents an operating efficiency of the transformer 17 as the voltage lowering means. All of these efficiencies are higher as the remaining capacity CAPAremc is greater. However, the driving efficiency of the electric motor 3 and the operating efficiency of the transformer 17 have their rates of reduction (their gradients) increased when the remaining capacity CAPAremc drops below certain values. In this embodiment, the remaining capacity REMC1 (e.g., 25%) below which the driving efficiency of the electric motor 3 drops greatly is used as the first predetermined remaining capacity, and the remaining capacity REMC2 (e.g., 70%) below which the operating efficiency of the transformer 17 drops greatly is used as the second predetermined remaining capacity.

When the remaining capacity CAPAremc of the capacitor 14 becomes smaller than the first predetermined remaining capacity REMC1, the driving efficiency of the electric motor 3 drops greatly, and the electric motor 3 practically fails to assist in running the hybrid vehicle. Therefore, the first predetermined remaining capacity REMC1 can be regarded as a minimum remaining capacity with which the electric motor 3 can be energized.

If "NO" in both STEP32 and STEP33, the MG/ECU 15 sets the regenerated quantity increasing corrective coefficient Kregup to "1.0" in STEP34. After STEP34 or STEP35, the MG/ECU 15 multiplies the decelerating regenerative quantity DECreg determined in STEP31 by the regenerated quantity increasing corrective coefficient Kregup to calculate a motor demand output power MOTORpower which is of a negative value according to the following equation (4):

$$MOTORpower = DECreg \times Kregup \tag{4}$$

In STEP37, the MG/ECU 15 generates a motor output power command MOTORcom which is delayed by a given time constant with respect to the motor demand output power MOTORpower. The decelerating regenerative control process shown in FIG. 13 now comes to an end.

The motor output power command MOTORcom (<0) thus generated is supplied from the MG/ECU 15 to the MOT/ECU 12. The MOT/ECU 12 controls the output power (the amount of regenerated electric energy) of the electric motor 3 through the PDU 13 according to the supplied motor output power command MOTORcom.

When the remaining capacity CAPAremc of the capacitor 14 becomes smaller than the first predetermined remaining capacity REMC1 according to the decelerating regenerative control process shown in FIG. 13, the regenerated quantity increasing corrective coefficient Kregup is basically set to a value greater than "1.0" for thereby increasing the amount of electric energy regenerated by the electric motor 3 so as to be greater than the decelerating regenerative quantity DECreg which is a basic amount of regenerated electric energy depending on the vehicle speed Vcar and the rotational speed NE of the engine (=the rotational speed NM of the electric motor 3). In this manner, the remaining capacity CAPAremc of the capacitor 14 can quickly be returned to a value equal to or greater than the first predetermined remaining capacity REMC1 at which the electric motor 3 has a good driving efficiency. As a result, when the hybrid vehicle needs to be assisted by the electric motor 3, electric energy can be supplied efficiently from the capacitor 14 to the electric motor 3 to enable the electric motor 3 to assist smoothly in running the hybrid vehicle. Furthermore, the remaining capacity CAPAremc of the capacitor 14 is prevented from decreasing excessively, and hence the capacitor 14 is prevented from being unduly deteriorated.

Even when the remaining capacity CAPAremc of the capacitor 14 is smaller than the first predetermined remaining capacity REMC1, if the remaining capacity CAPAremc is of a medium value smaller than the second predetermined remaining capacity REMC2 and also if the assistive-mode integrated discharged value DISCHG determined in the latest assistive mode is greater than the predetermined discharged quantity disch1, the regenerated quantity increasing corrective coefficient Kregup is basically set to a value greater than "1.0" for thereby increasing the amount of electric energy regenerated by the electric motor 3 so as to be greater than the decelerating regenerative quantity DECreg. Therefore, in situations where the possibility of assisting the hybrid vehicle with the electric motor 3 requiring a large drive power generated thereby is high, if the remaining capacity CAPAremc of the capacitor 14 is of a medium value greater than the first predetermined remaining capacity REMC1, the amount of electric energy regenerated by the electric motor 3 is increased when the hybrid vehicle decelerates. In such situations, the remaining capacity CAPAremc of the capacitor 14 can be maintained at a remaining capacity level that is sufficiently larger than the first predetermined remaining capacity REMC1. Consequently, in situations where the hybrid vehicle is to be assisted by the electric motor 3 requiring a large drive power generated thereby, the hybrid vehicle can smoothly be assisted by the electric motor 3.

Inasmuch as the second predetermined remaining capacity REMC2 is established taking into account the operating efficiency of the transformer 17 as the voltage lowering means, the remaining capacity CAPAremc of the capacitor 14 can be returned to a value equal to or greater than the second predetermined remaining capacity REMC2 at which the transformer 17 as the voltage lowering means has a good operating efficiency. As a consequence, the capacitor 14 can efficiently and smoothly supply electric energy to the low-voltage electric components, including the battery 18.

Even when the remaining capacity CAPAremc of the capacitor 14 is smaller than the second predetermined remaining capacity REMC2, if the assistive-mode integrated discharged value DISCHG in the latest assistive mode is equal to or smaller than the predetermined discharged quantity disch1, the amount of electric energy regenerated by the electric motor 3 is not increased. However, since the possibility of assisting the hybrid vehicle with the electric motor 3 requiring a large drive power generated thereby is low in this situation, the capacitor 14 can be charged by operation of the electric motor 3 for generating the decelerating regenerative quantity DECreg and regenerative operation of the electric motor 3 in the cruising regenerative mode, thereby to increase the remaining capacity CAPAremc of the capacitor 14.

The decelerating regenerative quantity DECreg which is a basic amount of electric energy regenerated by the electric motor 3 when the hybrid vehicle decelerates is established with the above tendency depending on the vehicle speed Vcar and the rotational speed NE of the engine 1 (=the rotational speed NM of the electric motor 3), irrespective of whether the amount of electric energy regenerated by the electric motor 3 is increased or reduced. For increasing the amount of electric energy regenerated by the electric motor 3 depending on the remaining capacity CAPAremc of the capacitor 14, the regenerated quantity increasing corrective coefficient Kregup for determining an increase in the amount of electric energy regenerated by the electric motor 3 is established with the above tendency (see FIG. 14) depending on the vehicle speed Vcar. As a result, braking forces (regenerative braking torque) for the hybrid vehicle which are produced by the regenerative operation of the electric motor 3 can be optimized for the running status of the hybrid vehicle. Furthermore, the kinetic energy applied through the drive axle 2 to the electric motor 3 by the regenerative operation of the electric motor 3 can effectively and sufficiently be converted into electric energy to charge the capacitor 14. Consequently, the energy efficiency of the hybrid vehicle can be increased.

Referring back to FIG. 6, in STEP17, the MG/ECU 15 establishes a command θtho to be finally given to the throttle actuator 105 as a command for the throttle valve opening θth in the decelerating regenerative mode. Thereafter, control proceeds to STEP21. The command θtho for the throttle valve opening θth is established according to a process not shown, and is "0" when the regenerated quantity increasing corrective coefficient Kregup is "1.0", i.e., when the amount of electric energy regenerated by the electric motor 3 is not to be increased. In this embodiment, the regenerated quantity increasing corrective coefficient Kregup is set to a value greater than "1.0". When the amount of electric energy regenerated by the electric motor 3 is to be increased, the command θtho is set to a value greater than "0" to increase the output power of the engine 1.

Thus, for increasing the amount of electric energy regenerated by the electric motor 3, the output power of the engine 1 in addition to the kinetic energy of the hybrid vehicle is supplied as an energy source to the electric motor 3 for its regenerative operation. Even when the vehicle speed Vcar is relatively low, therefore, the electric motor 3 can be operated reliably to increase the amount of electric energy regenerated thereby.

If the extra output power EXPOWER is of a value near "0" (the running status quantity VSTATUS is "0" because of "NO" to STEP8) in STEP15, then the MG/ECU 15 judges the present regenerative mode as the cruising regenerative mode, and sets the motor demand output power MOTORpower to an output power CRUISpower (which is of a negative value) for regenerating electric energy with the electric motor 3 while cruising the hybrid vehicle in STEP18. The output power CRUISpower is determined according to a routine not shown, and may be determined depending on the vehicle speed Vcar, the rotational speed NE of the engine or the rotational speed NM of the electric motor 3, and the remaining capacity CAPAremc of the capacitor 14.

In STEP19, the MG/ECU 15 generates a motor output power command MOTORcom in order to follow the motor demand output power MOTORpower with the delay of a given time constant, as with STEP12.

The motor output power command MOTORcom (<0) thus generated is supplied from the MG/ECU 15 to the MOT/ECU 12. The MOT/ECU 12 controls the output power (the amount of regenerated electric energy) of the electric motor 3 through the PDU 13 according to the supplied motor output power command MOTORcom.

In STEP20, the MG/ECU 15 calculates a corrective quantity (increasing value) θthsub for correcting a command for the throttle valve opening θth in a valve opening direction, depending on the motor output power command MOTORcom. Thereafter, control goes from STEP20 to STEP21.

The corrective quantity θthsub is calculated for the reasons that are opposite to the reasons for which the corrective term θthassist is calculated as described above.

Specifically, the motor demand output power MOTORpower established in the cruising regenerative mode is of a negative value and represents an amount of electric energy regenerated by the electric motor 3. Therefore, when the output power (generated electric energy) of the electric motor 3 is controlled according to the motor demand output power MOTORpower, the electric motor 3 absorbs the drive power (energy) corresponding to the amount of regenerated electric energy according to the motor demand output power MOTORpower, reducing the drive power of the hybrid vehicle, i.e., the electric motor 3 serves as a load on the engine 1. Thus, in order to maintain the demand drive power POWERcom as the drive power of the hybrid vehicle in the cruising regenerative mode, it is necessary to make up for the output power of the electric motor 3 which is absorbed by the regenerative operation of the electric motor 3, with the output power of the engine 1. To meet this requirement, according to the present invention, the corrective quantity θthsub is calculated depending on the motor demand output power MOTORpower in order to increase the output power of the engine 1 by an output power absorbed by the regenerative operation of the electric motor 3 in the cruising regenerative mode.

In STEP21, the MG/ECU 15 calculates a command θtho for the throttle valve opening θth to be finally given to the throttle actuator 105 from the throttle valve opening basic command θthcom determined in STEP3, the corrective quantity θthadd determined in STEP6, the corrective quantity θthassist determined in STEP14, and the corrective quantity θthsub determined in STEP20, according to the following equation (5):

$$\theta tho = \theta thcom + \theta thadd + \theta thsub - \theta thassist \quad (5)$$

In the assistive mode, the corrective quantity θthsub is set to "0", and in the cruising regenerative mode, the corrective quantity θthassist is set to "0".

In STEP22, the MG/ECU 15 decides whether or not the command θtho for the throttle valve opening θth is equal to or greater than a predetermined value θthref. If θtho<θthref, then the MG/ECU 15 decides whether or not the present intake pressure PBA detected by the intake pressure sensor 108 is equal to or smaller than a predetermined value PBAref in STEP23. If PBA>PBAref, then the processing sequence shown in FIGS. 5 and 6 is brought to an end in the present control cycle.

If θtho≧θthref in STEP22 or if PBA≦PBAref in STEP23, then the MG/ECU 15 changes the speed reduction ratio of the transmission mechanism 4 to a lower speed reduction ratio in STEP24. Thereafter, the processing sequence shown in FIGS. 5 and 6 is brought to an end in the present control cycle.

When control goes to STEP24, the output power of the engine 1 cannot be increased beyond the present output power level. At this time, the speed reduction ratio of the transmission mechanism 4 is changed to a lower speed reduction ratio to keep the torque produced by the drive axle 2 at a constant level, i.e., the same torque as before STEP24, to keep the drivability of the hybrid vehicle. The speed reduction ratio of the transmission mechanism 4 is actually changed by the TM/ECU 16 under the control of the MG/ECU 15.

An engine control process carried out by the ENG/ECU 11 will be described below.

FIG. 16 shows an overall engine control processing sequence, which is executed by the ENG/ECU 11 in each of predetermined control cycles, e.g., control cycles in synchronism with TDC (Top Dead Center).

In FIG. 16, the ENG/ECU 11 detects various engine operating parameters including the engine rotational speed NE, the intake pressure PBA, etc. in STEP131. Then, the ENG/ECU 11 determines an engine operating status in STEP132.

Thereafter, depending on the determined engine operating status, the ENG/ECU 11 executes a fuel control process for controlling the amount of fuel to be injected into the engine 1 and the timing of fuel injection with the fuel injection valves 106 in STEP133. Then, also depending on the determined engine operating status, the ENG/ECU 11 executes an ignition timing control process for controlling the timing of fuel ignition in the engine 1 with the ignition plugs 113 in STEP134, and then executes a throttle valve control process for controlling the throttle valve opening θth with the throttle actuator 105 in STEP135.

Specifically, the ENG/ECU 11 controls the amount of fuel to be injected into the engine 1 and the timing of fuel injection and also controls the timing of fuel ignition depending on the engine rotational speed NE, the intake pressure PBA, etc. in STEP 133 and STEP134. In STEP135, the ENG/ECU 11 also controls the operation of the throttle actuator 105 in order to equalize the actual throttle valve opening θth to the command θtho (which is determined in STEP14 or STEP18 shown in FIG. 6) for the throttle valve opening θth, which is supplied from the MG/ECU 15 to the ENG/ECU 11.

While the capacitor 14 is employed as the electric energy storage unit in the illustrated embodiment, the electric energy storage unit may instead comprise a battery (secondary cell).

If the remaining capacity CAPAremc of the capacitor 14 is greater than about 95%, for example, in the decelerating regenerative control process shown in FIG. 13, then the regenerated quantity increasing corrective coefficient Kregup may be set to a value smaller than "1.0" to reduce the amount of electric energy regenerated by the electric motor 3. With this modification, when the capacitor 14 is nearly fully charged, it is possible to reduce the amount of electric energy regenerated by the electric motor 3 to prevent the capacitor 14 from being charged excessively.

The throttle valve 103 of the DBW type may be replaced with an ordinary throttle valve that is mechanically linked to the accelerator pedal. In such a modification, the amount of intake air depending on the output power of the electric motor may be controlled by a passage bypassing the throttle valve and a control valve disposed in the passage. On an engine having a solenoid-operated intake valve which can electromagnetically be operated, rather than by a cam mechanism, the amount of intake air depending on the output power of the electric motor may be controlled by changing the valve opening period of the solenoid-operated intake valve.

The transmission mechanism 4 may comprise a continuously variable transmission mechanism whose speed reduction ratio can be continuously varied. With such a continuously variable transmission mechanism, the speed reduction ratio can be determined from the ratio of the rotational speed of the drive shaft of the continuously variable transmission mechanism to the rotational speed of the driven shaft thereof, rather than by detecting the gear position.

Although a certain preferred embodiment of the present invention has been shown and described in detail, it should be understood that various changes and modifications may be made therein without departing from the scope of the appended claims.

What is claimed is:

1. A control system for controlling a hybrid vehicle having an engine for rotating a drive axle, an electric motor for assisting the engine in rotating the drive axle with electric energy and converting kinetic energy of the drive axle into electric energy, and electric energy storage means for supplying electric energy to the electric motor and storing electric energy outputted by the electric motor, comprising:

remaining capacity detecting means for detecting a remaining capacity of the electric energy storage means; and decelerating regenerative control means for establishing an amount of electric energy to be regenerated by said electric motor when the hybrid vehicle decelerates depending on at least a vehicle speed of the hybrid vehicle, and causing said electric motor to regenerate the established amount of electric energy;

said decelerating regenerative control means comprises means for correcting said amount of electric energy to be regenerated by said electric motor depending on the remaining capacity of the electric energy storage means as detected by said remaining capacity detecting means and means for establishing said amount of electric energy to be regenerated by said electric motor such that said amount of electric energy to be regenerated by said electric motor, prior to being corrected depending on the remaining capacity of the electric energy storage means as detected by said remaining capacity detecting means, increases as said vehicle speed is higher.

2. A control system for controlling a hybrid vehicle having an engine for rotating a drive axle, an electric motor for assisting the engine in rotating the drive axle with electric energy and converting kinetic energy of the drive axle into electric energy, and electric energy storage means for supplying electric energy to the electric motor and storing electric energy outputted by the electric motor, comprising:

remaining capacity detecting means for detecting a remaining capacity of the electric energy storage means; and decelerating regenerative control means for establishing an amount of electric energy to be regenerated by said electric motor when the hybrid vehicle decelerates depending on at least a vehicle speed of the hybrid vehicle, and causing said electric motor to regenerate the established amount of electric energy;

said decelerating regenerative control means comprises means for correcting said amount of electric energy to be regenerated by said electric motor depending on the remaining capacity of the electric energy storage means as detected by said remaining capacity detecting means and means for establishing said amount of electric energy to be regenerated by said electric motor, prior to being corrected depending on the remaining capacity of the electric energy storage means as detected by said remaining capacity detecting means, depending on said vehicle speed and a rotational speed of said engine or said electric motor.

3. The control system according to claim 2 wherein said decelerating regenerative control means further comprises:

means for establishing said amount of electric energy to be regenerated by said electric motor such that said amount of electric energy to be regenerated by said electric motor, prior to being corrected depending on the remaining capacity of the electric energy storage means as detected by said remaining capacity detecting means, increases as said vehicle speed is higher, and increases as the rotational speed of said engine or said electric motor is higher.

4. The control system according to claim 2 wherein said electric energy storage means comprises an electric double-layer capacitor.

5. A control system for controlling a hybrid vehicle having an engine for rotating a drive axle, an electric motor for assisting the engine in rotating the drive axle with electric energy and converting kinetic energy of the drive axle into electric energy, and electric energy storage means for supplying electric energy to the electric motor and storing electric energy outputted by the electric motor, comprising:

remaining capacity detecting means for detecting a remaining capacity of the electric energy storage means; and decelerating regenerative control means for establishing an amount of electric energy to be regenerated by said electric motor when the hybrid vehicle decelerates depending on at least a vehicle speed of the hybrid vehicle, and causing said electric motor to regenerate the established amount of electric energy;

said decelerating regenerative control means comprises means for correcting said amount of electric energy to be regenerated by said electric motor depending on the remaining capacity of the electric energy storage means as detected by said remaining capacity detecting means and means for increasing said amount of electric energy to be regenerated by said electric motor if the remaining capacity of the electric energy storage means as detected by said remaining capacity detecting means is smaller than a first predetermined remaining capacity.

6. The control system according to claim 5, wherein a first predetermined remaining capacity is established on the basis of driving efficiency characteristics of the electric motor with respect to remaining capacity of the electric energy storage means when the electric motor operates to assist in running the hybrid vehicle.

7. The control system according to claim 6, further comprising:

discharged quantity integrating means for integrating a discharged quantity of said electric energy storage means each time and while the electric motor operates to assist in running the hybrid vehicle;

said decelerating regenerative control means comprising means for increasing said amount of electric energy to be regenerated by said electric motor if the remaining capacity of the electric energy storage means as detected by said remaining capacity detecting means is smaller than a second predetermined remaining capacity which is greater than said first predetermined remaining capacity and if an integrated value of the discharged quantity of said electric energy storage means, which is integrated by said discharged quantity integrating means while the electric motor has operated in a latest mode to assist in running the hybrid vehicle before the hybrid vehicle decelerates, is greater than a predetermined value.

8. The control system according to claim 7, further comprising:

voltage lowering means for converting an output voltage of said electric energy storage means into a lower voltage;

said electric energy storage means being connected through said voltage lowering means to electric components on the hybrid vehicle for supplying electric energy to said electric components, said second predetermined remaining capacity being established on the basis of operating efficiency characteristics of said voltage lowering means.

9. The control system according to claim 5 or 7, wherein said decelerating regenerative control means further comprises:

means for establishing a quantity by which to increase said amount of electric energy to be regenerated by said electric motor, depending on said vehicle speed.

10. The control system according to claim 9, wherein said decelerating regenerative control means further comprises:

means for establishing said quantity such that said quantity increases as said vehicle speed is higher.

11. A control system for controlling a hybrid vehicle having an engine for rotating a drive axle, an electric motor for assisting the engine in rotating the drive axle with electric energy and converting kinetic energy of the drive axle into electric energy, and electric energy storage means for supplying electric energy to the electric motor and storing electric energy outputted by the electric motor, comprising:

remaining capacity detecting means for detecting a remaining capacity of the electric energy storage means; and decelerating regenerative control means for establishing an amount of electric energy to be regenerated by said electric motor when the hybrid vehicle decelerates depending on at least a vehicle speed of the hybrid vehicle, and causing said electric motor to regenerate the established amount of electric energy;

said decelerating regenerative control means comprises means for correcting said amount of electric energy to be regenerated by said electric motor depending on the remaining capacity of the electric energy storage means as detected by said remaining capacity detecting means, means for determining a demand drive power for the hybrid vehicle depending on an accelerator pedal operation of the hybrid vehicle, means for determining a running resistance of the hybrid vehicle depending on said vehicle speed, and means for deciding whether the hybrid vehicle is decelerating or not based on the determined demand drive power and the determined running resistance.

12. A control system for controlling a hybrid vehicle having an engine for rotating a drive axle, an electric motor for assisting the engine in rotating the drive axle with electric energy and converting kinetic energy of the drive axle into electric energy, and electric energy storage means for supplying electric energy to the electric motor and storing electric energy outputted by the electric motor, comprising:

remaining capacity detecting means for detecting a remaining capacity of the electric energy storage means; and decelerating regenerative control means for establishing an amount of electric energy to be regenerated by said electric motor when the hybrid vehicle decelerates depending on at least a vehicle speed of the hybrid vehicle, and causing said electric motor to regenerate the established amount of electric energy;

said decelerating regenerative control means comprises means for correcting said amount of electric energy to be regenerated by said electric motor depending on the remaining capacity of the electric energy storage means as detected by said remaining capacity detecting means and means for increasing an output power of the engine when said decelerating regenerative control means increases said amount of electric energy to be regenerated by said electric motor.

* * * * *